(12) United States Patent
Ly et al.

(10) Patent No.: US 8,762,569 B1
(45) Date of Patent: Jun. 24, 2014

(54) SYSTEM FOR SELECTING A PROXY PAIR BASED ON CONFIGURATIONS OF AUTODISCOVERED PROXIES ON A NETWORK

(71) Applicant: Riverbed Technology, Inc., San Francisco, CA (US)

(72) Inventors: Kand Ly, Richmond, CA (US); Maksim Ioffe, San Francisco, CA (US); Alfred Landrum, Chicago, IL (US); Mark Stuart Day, Milton, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 13/744,364

(22) Filed: Jan. 17, 2013

Related U.S. Application Data

(62) Division of application No. 12/825,296, filed on Jun. 28, 2010, now Pat. No. 8,380,825, which is a division of application No. 11/755,692, filed on May 30, 2007, now Pat. No. 7,769,834.

(60) Provisional application No. 60/809,701, filed on May 30, 2006.

(51) Int. Cl.
*G06F 15/173* (2006.01)

(52) U.S. Cl.
USPC ............ 709/239; 709/242; 709/243; 709/238

(58) Field of Classification Search
USPC ......... 709/220, 221, 226, 223, 224, 225, 238, 709/239, 240, 242, 243, 219, 206, 230, 709/246; 370/352
See application file for complete search history.

(56) References Cited

U.S. PATENT DOCUMENTS

| | | | |
|---|---|---|---|
| 5,371,852 A | 12/1994 | Attanasio et al. |
| 5,737,594 A | 4/1998 | Williams |
| 5,754,774 A | 5/1998 | Bittinger et al. |
| 5,822,746 A | 10/1998 | Williams |
| 5,941,988 A | 8/1999 | Bhagwat et al. |

(Continued)

FOREIGN PATENT DOCUMENTS

| | | |
|---|---|---|
| JP | 2002/359649 A | 12/2002 |
| JP | 2004/254039 A | 9/2004 |

(Continued)

OTHER PUBLICATIONS

"Unleashing the True Power of Today's Networks," *A Peribit White Paper*, Aug. 2002, pp. 1-13, URL=http://www.peribit.com/products/etc/0217w02punl.htm.

(Continued)

*Primary Examiner* — Le H Luu
(74) *Attorney, Agent, or Firm* — Park, Vaughan, Fleming & Dowler LLP

(57) ABSTRACT

Network devices include proxies and where multiple proxies are present on a network, they can probe to determine the existence of other proxies. Where more than two proxies are present and thus different proxy pairings are possible, the proxies are programmed to determine which proxies should form a proxy pair. Marked probe packets are used by proxies to discover each other and probing is done such a connection can be eventually formed even if some probe packets fail due to the marking. Asymmetric routing can be detected and proxies configured for connection forwarding as necessary.

6 Claims, 28 Drawing Sheets

(56) References Cited

U.S. PATENT DOCUMENTS

| | | | |
|---|---|---|---|
| 5,990,810 A | 11/1999 | Williams | |
| 6,138,162 A | 10/2000 | Pistriotto et al. | |
| 6,163,811 A | 12/2000 | Porter | |
| 6,178,461 B1 | 1/2001 | Chan et al. | |
| 6,195,366 B1 | 2/2001 | Kayashima et al. | |
| 6,212,565 B1 | 4/2001 | Gupta et al. | |
| 6,311,216 B1 | 10/2001 | Smith et al. | |
| 6,347,342 B1 | 2/2002 | Marcos et al. | |
| 6,351,773 B1 | 2/2002 | Fijolek et al. | |
| 6,397,253 B1 | 5/2002 | Quinlan et al. | |
| 6,415,323 B1 | 7/2002 | McCanne et al. | |
| 6,415,329 B1 | 7/2002 | Gelman et al. | |
| 6,449,658 B1 | 9/2002 | Lafe et al. | |
| 6,473,406 B1 | 10/2002 | Coile et al. | |
| 6,487,538 B1 | 11/2002 | Gupta et al. | |
| 6,553,141 B1 | 4/2003 | Huffman | |
| 6,598,081 B1 | 7/2003 | Coile et al. | |
| 6,642,860 B2 | 11/2003 | Meulenbroeks | |
| 6,667,700 B1 | 12/2003 | McCanne et al. | |
| 6,678,828 B1 | 1/2004 | Pham et al. | |
| 6,704,730 B2 | 3/2004 | Moulton et al. | |
| 6,721,780 B1 | 4/2004 | Kasriel et al. | |
| 6,757,733 B2 | 6/2004 | Gupta | |
| 6,772,193 B1 | 8/2004 | Igawa et al. | |
| 6,822,955 B1 | 11/2004 | Brothers et al. | |
| 6,826,626 B1* | 11/2004 | McManus | 709/246 |
| 6,845,393 B1 | 1/2005 | Murphy et al. | |
| 6,874,017 B1 | 3/2005 | Inoue et al. | |
| 6,892,235 B1 | 5/2005 | Daude et al. | |
| 6,894,981 B1 | 5/2005 | Coile et al. | |
| 6,910,068 B2 | 6/2005 | Zintel et al. | |
| 6,940,835 B2 | 9/2005 | Reza et al. | |
| 6,973,485 B2 | 12/2005 | Ebata et al. | |
| 6,981,029 B1 | 12/2005 | Menditto et al. | |
| 7,016,973 B1 | 3/2006 | Sibal et al. | |
| 7,047,485 B1 | 5/2006 | Klein et al. | |
| 7,120,666 B2 | 10/2006 | McCanne et al. | |
| 7,123,599 B2 | 10/2006 | Yano et al. | |
| 7,123,613 B1 | 10/2006 | Chawla et al. | |
| 7,161,947 B1 | 1/2007 | Desai | |
| 7,162,529 B2 | 1/2007 | Morishige et al. | |
| 7,316,028 B2 | 1/2008 | Donatelli et al. | |
| 7,318,100 B2 | 1/2008 | Demmer et al. | |
| 7,328,260 B1 | 2/2008 | Muthiyan et al. | |
| 7,512,689 B2 | 3/2009 | Saint-Hilaire et al. | |
| 7,565,407 B1 | 7/2009 | Hayball | |
| 7,577,729 B1 | 8/2009 | Umbehocker et al. | |
| 7,610,393 B1 | 10/2009 | Chen et al. | |
| 7,650,416 B2 | 1/2010 | Wu et al. | |
| 7,774,495 B2 | 8/2010 | Pabla et al. | |
| 2001/0051927 A1 | 12/2001 | London et al. | |
| 2002/0038371 A1 | 3/2002 | Spacey | |
| 2002/0062384 A1 | 5/2002 | Tso | |
| 2002/0087547 A1 | 7/2002 | Kausik et al. | |
| 2002/0091801 A1 | 7/2002 | Lewin et al. | |
| 2002/0138511 A1 | 9/2002 | Psounis et al. | |
| 2002/0156911 A1 | 10/2002 | Croman et al. | |
| 2002/0157019 A1 | 10/2002 | Kadyk et al. | |
| 2002/0161904 A1 | 10/2002 | Tredoux et al. | |
| 2002/0194382 A1 | 12/2002 | Kausik et al. | |
| 2003/0012179 A1 | 1/2003 | Yano et al. | |
| 2003/0043844 A1 | 3/2003 | Heller | |
| 2003/0055826 A1 | 3/2003 | Graham | |
| 2003/0065711 A1 | 4/2003 | Acharya et al. | |
| 2003/0115488 A1 | 6/2003 | Kunito et al. | |
| 2003/0163646 A1 | 8/2003 | O'Neil | |
| 2003/0174648 A1 | 9/2003 | Wang et al. | |
| 2003/0217151 A1 | 11/2003 | Roese et al. | |
| 2003/0225889 A1 | 12/2003 | Moutafov | |
| 2004/0128393 A1 | 7/2004 | Blakley et al. | |
| 2004/0205208 A1* | 10/2004 | Koponen et al. | 709/230 |
| 2004/0215746 A1* | 10/2004 | McCanne et al. | 709/219 |
| 2004/0243703 A1* | 12/2004 | Demmer et al. | 709/224 |
| 2005/0044242 A1 | 2/2005 | Stevens et al. | |
| 2006/0077955 A1* | 4/2006 | Poustchi et al. | 370/352 |
| 2006/0212524 A1* | 9/2006 | Wu et al. | 709/206 |
| 2006/0248194 A1* | 11/2006 | Ly et al. | 709/226 |
| 2008/0320154 A1 | 12/2008 | Demmer et al. | |

FOREIGN PATENT DOCUMENTS

| | | |
|---|---|---|
| JP | 2004/348495 A | 12/2004 |
| WO | 95/20793 A | 8/1995 |
| WO | 00/13110 A | 3/2000 |
| WO | 01/80022 A | 10/2001 |
| WO | 02/054699 A | 7/2002 |

OTHER PUBLICATIONS

Amer et al., "File Access Prediction with Adjustable Accuracy." *Conf. Proc. of 2002 IEEE Int. Performance, Computing, and Communications,* 21:131-140, conference held Apr. 3, 2002-May 5, 2002, Phoenix, Arizona.

Caceres et al., "Web Proxy Caching: The Devil is in The Details," *Proceedings of the Workshop on Internet Server Performance,* Jun. 1998, pp. 111-118, Scienific Literature Digital Library, Madison, Wisconsin, USA.

Deshpande et al., "Selective Markov Models for Predicting Web-Page Accesses," *ACM Transactions on Internet Technology,* 2004, pp. 163-184, vol. 4, Issue 2.

Factor et al., "Compression in the Presence of Shared Data," *International Journal of Computing and Information Sciences,* Jun. 2001, pp. 29-41, vol. 135, Issue 1-2.

Fan et al., "Summary Cache: A Scalable Wide Area Web Cache Sharing Protocol," *Proceedings of the IEEE/ACM Transactions on Networking,* Jun. 2000, vol. 8, No. 3, pp. 281-293.

Feldmeier et al., "Protocol Boosters," *IEEE JSAC,* Apr. 1998, pp. 437-444, vol. 16, Issue 3.

Griffoen et al., "Automatic Prefetching in a WAN," *Proceedings of the IEEE Workshop on Advances in Parallel and Distributed Systems,* Oct. 1993, Technical Report #CS243-93, pp. 8-12.

Griffoen et al., "Reducing File System Latency Using a Predictive Approach," *Proceedings of the USENIX Summer 1994 Technical Conference on USENIX,* Jun. 1994, vol. 1.

Housel et al., "Emulator Express: A System for Optimizing Emulator Performance for Wireless Networks," *IBM Systems Journal,* 2000, pp. 384-402, vol. 39, Issue. 2.

Kahol et al., "A Strategy to Manage Cache Consistency in a Disconnected Distributed Network," IEEE. Transactions on Parallel and Distributed Systems, Jul. 2001, pp. 686-700, vol. 12, Issue 7, IEEE Computer Society. Los Alamitos, California, USA.

Knutsson, Bjorn et al., "Transparent Proxy Signaling," 1999, Department of Information Technology; Department of Computer Systems, Journal of Communications and Networks, vol. 3, No. 2, University of Uppsala, Uppsala, Sweden, pp. 164-174.

Lei et al., "An Analytical Approach to File Prefetching," *Proceedings of the Annual Conference on USENIX Annual Technical Conference,* Jan. 1997, pp. 1-12, Anaheim, California, USA.

Mellia, M., "TCP Smart-Framing: Using Smart Segments to Enhance the Performance of TCP," Global Telecommunications Conference, 2001, GLOBECOM '01, *IEEE,* vol. 3, Nos. 25-29, Nov. 2001, pp. 1708-1712.

Muthitacharoen et al., "A Low-bandwidth Network File System," *Proceedings of the 18th ACM Symposium on Operating System Principles (SOSP '01),* Oct. 21-24, 2001, pp. 174-187.

Oly, James et al., "Markov Model Prediction of I/O Requests for Scientific Applications," Jun. 2002, *Proceedings of the 16th International Conference on Supercomputing,* pp. 147-155.

Padmanabhan et al., "Using Predictive Prefetching to Improve World Wide Web Latency," *IEEE Transactions on Antennas and Propagation,* 26(3):22-36 (1996).

Rhea et al., "Value-Based Web Caching," *Proceedings of the 12th International Conference on World Wide Web,* Budapest, Hungary, May 2003, pp. 619-628, ACM New York, New York, USA.

Rodriguez et al., "TPOT: Translucent Proxying of TCP," Computer Communications, vol. 24, No. 2, pp. 249-255 (Feb. 2001).

(56) References Cited

OTHER PUBLICATIONS

Spring et al., "A Protocol-Independent Technique for Eliminating Redundant Network Traffic," *Proceedings of ACM SIGCOMM, Computer Communication Review*. Oct. 2000, pp. 87-95, vol. 30, Issue 4.

Tolia et al., "An Architecture for Internet Data Transfer," Third Symposium on Networked Systems Design and Implementation (NSDI'06), May 2006, San Jose, California, USA.

White, J., "Supply Chain Responsiveness", BRITVIC Soft Drinks, Carrow, Norvich, (Feb. 23, 1998), XP006506548.

Yang, Qiang et al., "Mining Web Logs for Prediction Models in WWW Caching and Prefetching," Aug. 2001, Proceedings of the Seventh ACM SIGKDD International Conference on Knowledge Discovery and Data Mining KDD'01, San Francisco, California, pp. 473-478.

USPTO Office Action for U.S. Appl. No. 12/135,114 mailed Feb. 17, 2011.

USPTO Office Action for U.S. Appl. No. 12/135,114 mailed Aug. 14, 2011.

Non-Final Office Action from U.S. Appl. No. 13/082,186 mailed Jun. 28, 2011.

Notice of Allowance for U.S. Appl. No. 13/082,186 mailed Jul. 30, 2013.

European Office Action received Jul. 19, 2010 in related European Application No. 05736807.8.

International Search Report and Written Opinion, mailed Sep. 29, 2008, for PCT Application No. PCT/US2007/70005, (8 pages).

\* cited by examiner

SYSTEM FOR SELECTING A PROXY PAIR BASED ON CONFIGURATIONS OF AUTODISCOVERED PROXIES ON A NETWORK

CROSS-REFERENCE TO RELATED APPLICATIONS

The present disclosure may be related to the following commonly assigned applications/patents:

This application is a divisional patent application of U.S. Non-Provisional patent application Ser. No. 12/825,296, filed Jun. 28, 2010, which is a divisional patent application of and claims priority from U.S. Non-Provisional patent application Ser. No. 11/755,692, filed May 30, 2007 which claims priority from and is a non-provisional of U.S. Provisional Patent Application No. 60/809,701 filed May 30, 2006, the entire disclosures of these applications are incorporated herein by reference for all purposes.

U.S. patent application Ser. No. 10/285,315, filed Oct. 30, 2002 and entitled "Transaction Accelerator for Client-Server Communication Systems", now U.S. Pat. No. 7,120,666 B2 issued Oct. 10, 2006 (hereinafter "McCanne I");

U.S. patent application Ser. No. 10/640,405, filed Aug. 12, 2003 and entitled "Transparent Client-Server Transaction Accelerator", now U.S. Publication No. 2004/0215746 published Oct. 28, 2004 (hereinafter "McCanne III");

U.S. patent application Ser. No. 10/640,562, filed Aug. 12, 2003 and entitled "Cooperative Proxy Auto-Discovery and Connection Interception", now U.S. Publication No. 2004/0243703 published Dec. 2, 2004 (hereinafter "McCanne IV");

U.S. patent application Ser. No. 10/640,459, filed Aug. 12, 2003 and entitled "Content Delivery for Client-Server Protocols with User Affinities using Connection End-Point Proxies" now U.S. Publication No. 2005/0125553 published Jun. 9, 2005 (hereinafter "McCanne V");

U.S. patent application Ser. No. 11/377,906, filed Mar. 15, 2006 and entitled "Connection Forwarding" now U.S. Publication No. 2006/0248194 published Nov. 2, 2006 (hereinafter "Ly"); and U.S. patent application Ser. No. 11/683,325, filed Mar. 7, 2007 and entitled "Address Manipulation for Network Transparency and Troubleshooting" (hereinafter "Landrum").

The respective disclosures of these applications/patents are incorporated herein by reference in their entirety for all purposes.

FIELD OF THE INVENTION

The present invention relates to the field of communication networks, and specifically to supporting improvements delivered via network proxies.

BACKGROUND OF THE INVENTION

A network is typically used for data transport among devices at network nodes distributed over the network. Some networks are considered "local area networks" (LANs), others are considered "wide area networks" (WANs), although not all networks are so categorized and others might have both LAN and WAN characteristics. Often, a LAN comprises nodes that are all controlled by a single organization and connected over dedicated, relatively reliable and physically short connections. An example might be a network in an office building for one company or division. By contrast, often a WAN comprises nodes that might include nodes over which many different organization's data flow, and might involve physically long connections. In one example, a LAN might be coupled to a global internetwork of networks referred to as the "Internet" such that traffic from one node on the LAN passes through the Internet to a remote LAN and then to a node on that remote LAN.

Data transport is often organized into "transactions", wherein a device at one network node initiates a request for data from another device at another network node and the first device receives the data in a response from the other device. By convention, the initiator of a transaction is referred to herein as the "client" and the responder to the request from the client is referred to herein as the "server". As used herein, "client" generally refers to a computer, computing device, peripheral, electronics, or the like, that makes a request for data or an action, while "server" generally refers to a computer, computing device, peripheral, electronics, or the like, that operates in response to requests for data or action made by one or more clients. Depending upon the context, a computer or other device may function as both a client and/or a server.

As explained above, a transaction over a network involves bidirectional communication between two computing entities, where one entity is the client and initiates a transaction by opening a network channel to another entity (the server). Typically, the client sends a request or set of requests via a set of networking protocols over that network channel, and the request or requests are processed by the server, returning responses. Many protocols are "connection-based", whereby the two cooperating entities (sometimes known as "hosts") negotiate a communication session to begin the information exchange. In setting up a communication session, the client and the server might each maintain state information for the session, which may include information about the capabilities of each other. At some level, the session forms what is logically (or physically, in some cases) considered a "connection" between the client and server. Once the connection is established, communication between the client and server can proceed using state from the session establishment and other information and send messages between the client and the server, wherein a message is a data set comprising a plurality of bits in a sequence, possibly packaged as one or more packets according to an underlying network protocol. Typically, once the client and the server agree that the session is over, each side disposes of the state information for that transaction, other than possibly saving log information.

A client makes requests to a server, which typically delivers a response to each request back to the client. McCanne I and McCanne III describe how a network proxy communicating with one or more peer network proxies can offer valuable forms of transaction acceleration and traffic reduction. In such cases, for example, a client's request can be intercepted by a client-side network proxy and delivered to the server by a server-side network proxy. The request may be transformed or processed by the two proxies so that it (and possibly future requests) is more effectively transported across the intervening network than would be true without the use of the cooperating network proxies.

A message from a client to a server or vice-versa traverses one or more network "paths" connecting the client and server. A basic path would be a physical cable connecting the two hosts. More typically, a path involves a number of physical communication links and a number of intermediate devices (e.g., routers) that are able to transmit a packet along a correct path to the server, and transmit the response packets from the server back to the client. These intermediate devices typically do not modify the contents of a data packet; they simply pass the packet on in a correct direction. However, it is possible that a device that is in the network path between a client and a server could modify a data packet along the way. To avoid violating the semantics of the networking protocols, any such modifications should not alter how the packet is eventually processed by the destination host.

A network proxy is a transport-level or application-level entity that functions as a performance-enhancing intermediary between the client and the server. In this case, a proxy is the terminus for the client connection and initiates another connection to the server on behalf of the client. Alternatively, the proxy connects to one or more other proxies that in turn connect to the server. Each proxy may forward, modify, or otherwise transform the transactions as they flow from the client to the server and vice versa. Examples of proxies include (1) Web proxies that enhance performance through caching or enhance security by controlling access to servers, (2) mail relays that forward mail from a client to another mail server, (3) DNS relays that cache DNS name resolutions, and so forth.

One problem that must be overcome when deploying proxies is that of directing client requests to the proxy instead of to the destination server. One mechanism for accomplishing this is to configure each client host or process with the network address information of the proxy. This requires that the client application have an explicit proxy capability, whereby the client can be configured to direct requests to the proxy instead of to the server. In addition, this type of deployment requires that all clients must be explicitly configured and that can be an administrative burden on a network administrator.

One way around the problems of explicit proxy configuration is to deploy a "transparent proxy". The presence of the transparent proxy is not made explicitly known to the client process, so all client requests proceed along the network path towards the server as they would have if there were no transparent proxy. Some benefits of a transparent proxy require that a proxy pair exist in the network path. For example, if a proxy is used to transform data in some way, a second proxy preferably untransforms the data. For actions that require a proxy pair, preferably both proxies in the proxy pair do not perform a transformation unless they can be assured of the existence and operation of the other proxy in the proxy pair. Where each proxy must be explicitly configured with indications of the pairs to which it belongs and to the identity of the other members of those pairs, the administrative burden on a network administrator might well make some operations infeasible if they require proxy pairs. Even where a proxy is interposed in a network and gets all of the traffic from a client or server, it still must discover the other member for each proxy pair the proxy needs, if the proxy is to perform actions that require proxy pairs.

As used herein, "proxy pairing" is a process of associating two proxies. The two proxies are members of a proxy pair and each member of a proxy pair is aware of the other member of the proxy pair and knows its address (or other identifier). A given proxy can be a member of more than one proxy pair. Where a given proxy is a member of a plurality of proxy pairs, the other members of those proxy pairs can be distinct or can be duplicative, i.e., there might be more than one proxy pair that has the same two members. In some cases, a proxy pair might be generalized to a "proxy grouping" of more than two proxies for purposes equivalent to what a proxy pair might do.

Generally, a proxy pair exists in relation to one or more transactions. Thus, proxy A and proxy B might be paired for some transactions and not others. Often, two proxies are paired for all transactions between pairs of particular clients and particular servers. In most instances, a proxy pair comprises a client-side proxy ("CP") and a server-side proxy ("SP") and each member of the proxy pair is aware of which side (client or server) they are on.

The proxies in a proxy pair can become aware of the pair and the other member (and which side they are on) using techniques described in McCanne IV or other methods. Once the proxies in a proxy pair are aware of the pairing and the other member, the pair can intercept network transactions. With the pairing, the optimizations need not conform to the end-to-end network protocol, as each proxy can undo nonconforming operations of the other proxy.

However, where network traffic between client and server can pass through an arbitrary number of potential cooperating proxies, it is useful to be able to pick two specific proxies of those, such as two proxies that match some criteria. One useful choice is the two proxies that are "outermost", i.e., closest to the client and closest to the server. Another useful choice is the two proxies that are on either side of the worst (slowest performing) connection or network.

Forms of proxy discovery described in McCanne IV include single instance probing and proxy chain probing. With single instance probing, a single client-side proxy (CP) probes for a single instance of a server-side proxy (SP). With proxy chain probing, a single client-side proxy establishes a proxy chain of multiple middle proxies (MPs) and a final SP.

Improvements for proxy pairing are desirable. For example, where some pairings are better than others, they should be selected for. Also, where marked probe packets are used by proxies to discover each other, those can be rejected by some servers and that should be dealt with so that client/server connections do not fail. A related multiple-proxy problem is where traffic does not have a consistent path through proxies, but instead some traffic passes through one proxy initially and some traffic passes through one or more others. Ly describes this problem as asymmetric routing. Ly provides some solutions for dealing with asymmetric routing.

It is therefore desirable for a system and method to facilitate the discovery and selection of optimal sets of cooperating proxies in the presence of multiple candidate proxies or despite confounding network issues, possibly allowing for connections to be established even when probe packets are rejected, even in the presence of multiple intermediate proxies, and possibly also automatically detecting asymmetric routing conditions and configuring proxies for connection forwarding as necessary.

BRIEF SUMMARY OF THE INVENTION

In embodiments of a network and or devices operating on a network, proxies are programmed to probe to determine the existence of other proxies and where different pairs of proxies are possible, the proxies are programmed to determine which proxies should form a proxy pair.

In other aspects, marked probe packets are used by proxies to discover each other and probing is done such a connection can be eventually formed even if some probe packets fail.

In another aspect, asymmetric routing is detected and proxies are configured for connection forwarding as necessary.

The following detailed description together with the accompanying drawings will provide a better understanding of the nature and advantages of the present invention.

Figure 1:
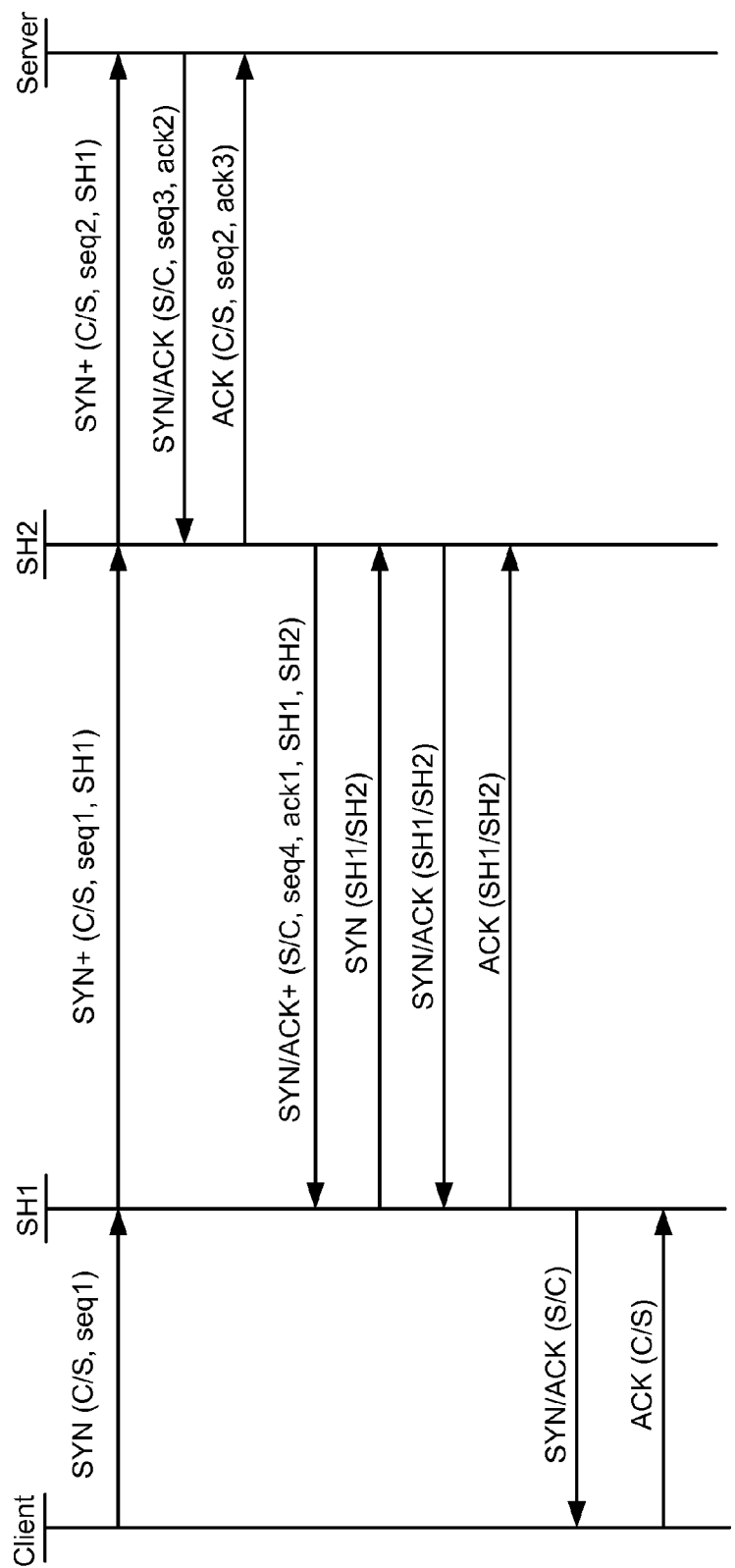
FIG. 1 is a swim diagram illustrating probe request message processing according to an embodiment of the invention.

An Appendix A comprising a source code listing is included as part of this disclosure.

DETAILED DESCRIPTION OF THE INVENTION

An improved proxying system is described herein, wherein proxies are selected to improve communications and to allow for features between proxy pair that would be impossible or difficult to implement for some proxy pairings and the selection is done to reduce or eliminate the selection of such problematic proxy pairings.

Some benefits of a transparent proxy require that a proxy pair exist in the network path. For example, if a proxy is used to transform data in some way, a second proxy preferably untransforms the data. For example, where traffic between a client and a server is to be compressed or encrypted for transport over a portion of the network path between the client and the server, a proxy on one side of that portion would compress or encrypt data before it flows over that portion and a proxy on the other side of that portion would uncompress or decrypt the data and send it along the network path, thereby providing for transparent transformation of data flowing between the client and the server.

The proxies in a proxy pair can become aware of the pair and the other member (and which side they are on) by being explicitly configured as a proxy in a proxy pair, the proxies can become aware based on information provided by a client or a server (which typically requires an appropriately configured client or server), or the proxies can automatically discover possible proxy pairs using techniques described herein. Naturally, if proxies can discover proxy pairs of which they are members without any assistance from a client, a server or a network configurator, in a way that such discovery can have been transparent to clients and servers, operation and maintenance of a proxy pairing system is greatly simplified.

Connection interception can be done by a number of different devices, which might involve hardware, software, or both. Interception can be done with a computer, computing device, peripheral, electronics, or the like, and/or using an application being executed or controlled by such element. The interception mechanism can be integrated into a network device such as a router or a bridge, such that some of the traffic that flows through the device is altered by the interception mechanism. The interception mechanism may alternatively be integrated into the client and/or the server itself. Thus, when describing herein a client-side proxy and/or server-side proxy, those terms need not necessarily refer to separate physical hosts or computing entities, but may be logical entities that are part of the client, the server, and/or any other routers, devices or hosts along the network path between the client and server.

The general term "proxy device" is used to refer to a proxy that could be a client-side proxy, a server-side proxy, or both (client-side proxy for some pairs/transactions, server-side proxy for other pairs/transactions). The functionality described herein as the CP and the functionality described herein as the SP can exist in one proxy device, such that the proxy device functions as both an SP and a CP, simultaneously, for different client-server connections.

It should be understood that while clients, servers and proxy devices are shown herein in various places as stand-alone boxes, clients, servers and proxies can be implemented as discrete hardware elements, software elements running on a programmable computing element (desktop computer, handheld device, router, switch, embedded logic device, etc.), firmware, or some combination, running as distinct elements or integrated with other elements. For example, a router might include software to implement a proxy device ("PD") that might be a CP or an SP for some transactions, with that CP or SP functionality entirely implemented as part of the router.

Basic Implementation

FIG. 1 is a swim diagram illustrating probe request message processing according to an embodiment of the invention. The swim diagrams presented herein illustrate messages, packets, transactions, etc. effected by data passing between nodes of a network and being acted upon by devices, circuits, software, etc. at those nodes. For example, FIG. 1 illustrates an example of traffic among a client, a server and two proxies. Some of the figures show corresponding hardware block diagrams, but where omitted, it should be understood that the vertical lines of a swim diagram correspond to recipients and/or senders of data that corresponds to the data flow arrows that proceed in a generally horizontal direction and it should be understood that data flows are not abstract concepts, but represent data flowing from one electronic device or portion thereof to another electronic device or portion thereof. Unless otherwise indicated, it should be understood that time flows from top to bottom, such that an action represented by a horizontal arrow higher in a figure occurs before an action represented by a horizontal arrow lower in the figure and that sometimes a chain of actions that happen one after another with a chain of devices is shown by more than one horizontal line segment at the same relative vertical position.

Also, unless otherwise indicated, data flowing to a device represented by a vertical line in a swim diagram can be in the form of bits or symbols presented through a channel using lower level hardware circuits adapted for such purpose. For example, the initiating SYN packet illustrated in FIG. 1 as flowing from client C to proxy SH1, might involve packaging data into a TCP packet, encoded by a MAC layer and processed through a PHY layer interface, and while those details are omitted, they are know to one of ordinary skill in the art of network communication, so they are not repeated here so that the present disclosure is clear and does not obscure the essential teachings of this disclosure.

In the process represented by FIG. 1, proxies process and/or generate probe request messages. Proxies can be programmed to respond to probe request messages under some conditions. For example, perhaps a proxy that receives a probe request is programmed to not respond with a probe response immediately, but instead will continue probing towards the server to check if it is the proxy closest to the server and whether it should intercept the connection. One way to intercept a connection is to form a connection with one communicant (client, server, other proxy), such as a TCP connection, and form another connection with another communicant. For example, a proxy might have one connection with a client and another connection with a server and operate such that the client and/or server believe that it has a connection directly (or operates such that it does not matter).

One aspect of a connection such as a TCP connection is that packets include sequence numbers and each communicant might expect sequential use of those sequence numbers and packet consistency wherein a packet with a particular sequence number comes out of one end of a connection for each time a packet goes into the connection and has that same sequence number. Where a proxy is in the middle of a connection that spans through the proxy, this is kept consistent, but where the data flows into a proxy over one connection that terminates at the proxy and out over another connection that terminates at the proxy, those consistencies are not needed through the whole path from, say, a client to a server, because there are separate connections.

Referring again to FIG. 1, a client begins by sending a SYN message to a server and that SYN message first passes through a proxy SH1. Proxy SH1 might be a Steelhead™ transaction accelerator made by Riverbed Technology, Inc., but might also be a different proxy. In this example, proxy SH1 is programmed to attach a probe request to the SYN with its IP address in it.

When SH2 receives the probe request sent by SH1, SH2 is programmed to check the probe request to determine whether it originated with SH2 or elsewhere. SH2 creates its own TCP connection to the server with a different sequence number. SH2 attaches the same probe as SH1 to the SYN. SH2 receives a SYN/ACK (acknowledgment of the SYN, or sync, request) message from the server. SH2 completes its connection to the server with an ACK message. SH2 sends a probe response with its service IP address and port and modifies the ACK number. SH1 receives the probe response from SH2 and connects to SH2's service IP address and port. SH1 completes its connection to the client with a SYN/ACK. Client completes its connection to the server with an ACK.

In the embodiment shown in FIG. 1, creating a new TCP connection on SH2 with a different sequence number avoids problems with asymmetric routing. SH2 can also update its neighbors if connection forwarding (as described in Ly) is configured.

The proxies can discover of the last proxy in a serial cascade of proxies without having to configure peering rules. If a proxy can determine whether it is the last proxy, it can automatically pair up as an "outermost" proxy, i.e., the proxy closest to the client or the proxy closest to the server. In this embodiment, the probe response will be created by the last proxy that receives the SYN/ACK from the server. Other intermediate proxies can detect that they are not the closest proxy and, if they have state for that connection, they can delete it and let the probe response go through.

Figure 2:
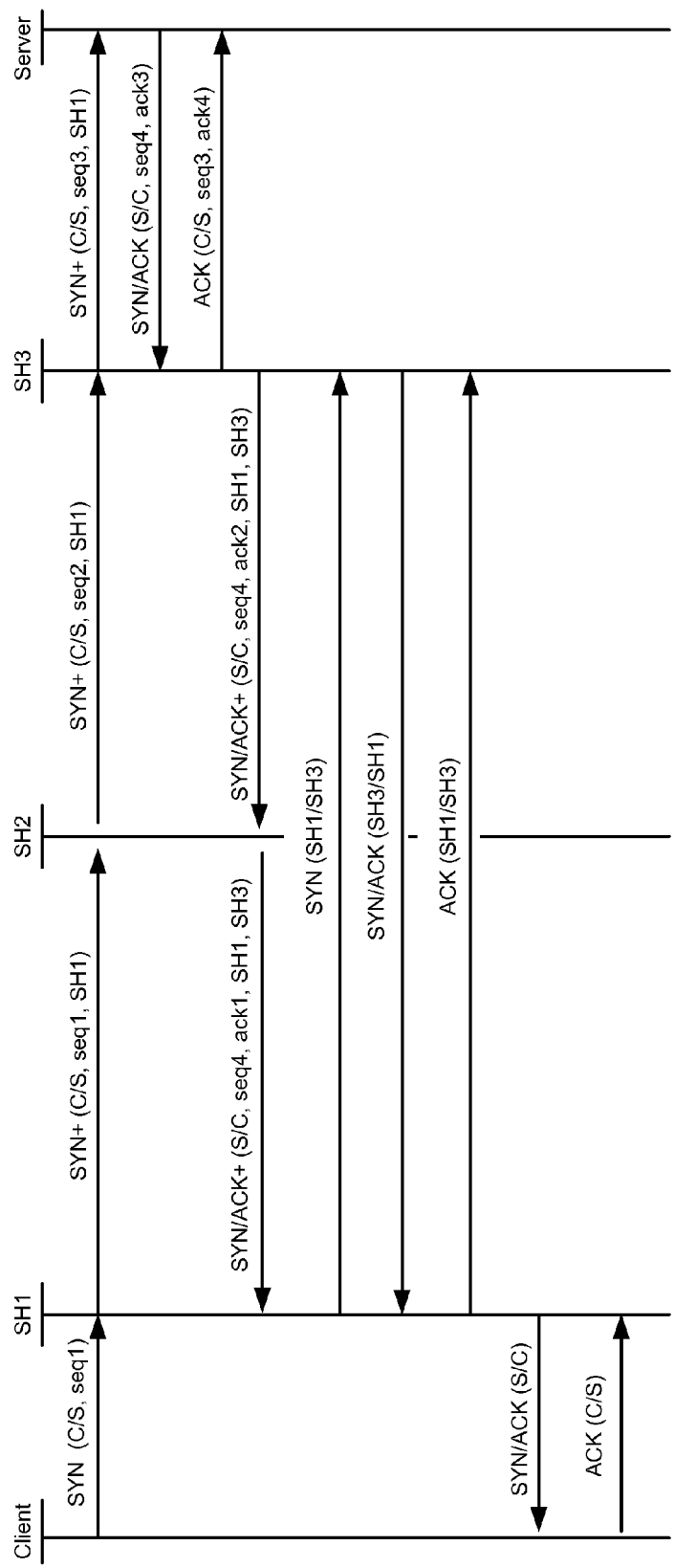
FIG. 2 is a swim diagram illustrating probe request message processing with one intermediate proxy according to an embodiment of the invention.

FIG. 2 is a swim diagram illustrating probe request message processing with one intermediate proxy according to an embodiment of the invention. As shown there, a path so configured would have SH1 and SH3 representing the outermost proxies and SH2 representing an intermediate proxy. There, the first proxy SH1 will intercept the connection with the last proxy SH3. When the client sends a SYN to server and SH1 attaches a probe request to the SYN with SH1's IP address in it, SH2 will receive the probe request and check if the request was not sent by SH2. SH2 creates its own TCP connection to the server with a different sequence number. SH2 attaches the same probe as SH1 to the SYN. SH3 receives the probe request and checks if it was not sent by SH3. SH3 creates its own TCP connection to the server with a different sequence number. SH3 attaches the same probe as SH1 to the SYN. SH3 receives a SYN/ACK from the server. SH3 completes its connection to the server with an ACK. SH3 sends a probe response with its service IP address and port and modifies the ACK number. SH2 releases state for that connection and pass-through the probe response from SH3. SH1 receives the probe response from SH3 and connects to SH3 service IP address and port. SH1 completes its connection to the client with a SYN/ACK. Client completes its connection to the server with an ACK.

In the example of FIG. 2, peering rules are not needed to pass through probe requests. The user will still be able to configure a pass-through peering rule for a serial cluster or in case the user wants to configure pass-through traffic on the server side, but these peering rules may be overridden on the client side proxy by a fixed target rule.

Peering rules can still be used if users want to have an intermediate proxy intercept connections to have clear data going on in a certain portion of their network. Peering rules would exist for serial clustering, otherwise proxies in the same cluster could end up intercepting connections between themselves when there is no proxy on the server side.

Where multiple connections exist between a client and a server, an inner connection is an established connection for communication between a client-side proxy (CP) and a server-side proxy (SP) in support of their optimization or acceleration of a particular client/server (outer) connection. Because it carries optimized traffic, an inner connection is not a good candidate for interception and processing by other, intermediate proxies. In those cases, it would be desirable to indicate to intermediate proxies that all of the processing is happening elsewhere and the intermediate proxies should not intercept an inner connection. This indication might occur by one of the CP and/or SP marking the SYN packet of that connection, such as by adding a TCP option to the SYN packet.

The TCP option might use the same value as the discovery probe but with a different type. The TCP option might be the same as the transparency mode TCP option, as described in Landrum. The specific case of the inner connection being passed through uses special or reserved values that distinguish it from other transparent connections.

If the server or a network device drops the probe request, the client might retransmit the SYN packet a few times before timing out. With retransmitted SYN packets, if a proxy's attachment of a probe request causes the packet to be rejected further down the line, the proxy might be programmed to avoid adding the probe request to the retransmitted SYN packet, so that the retransmitted SYN survives and the connection is passed through. For example, network communications in the Windows XP™ SP2 operating system are such that a SYN is retransmitted twice, so if two SYNs fail, a proxy can skip adding the probe request when it receives the third SYN packet and that one should go through.

Figure 3:
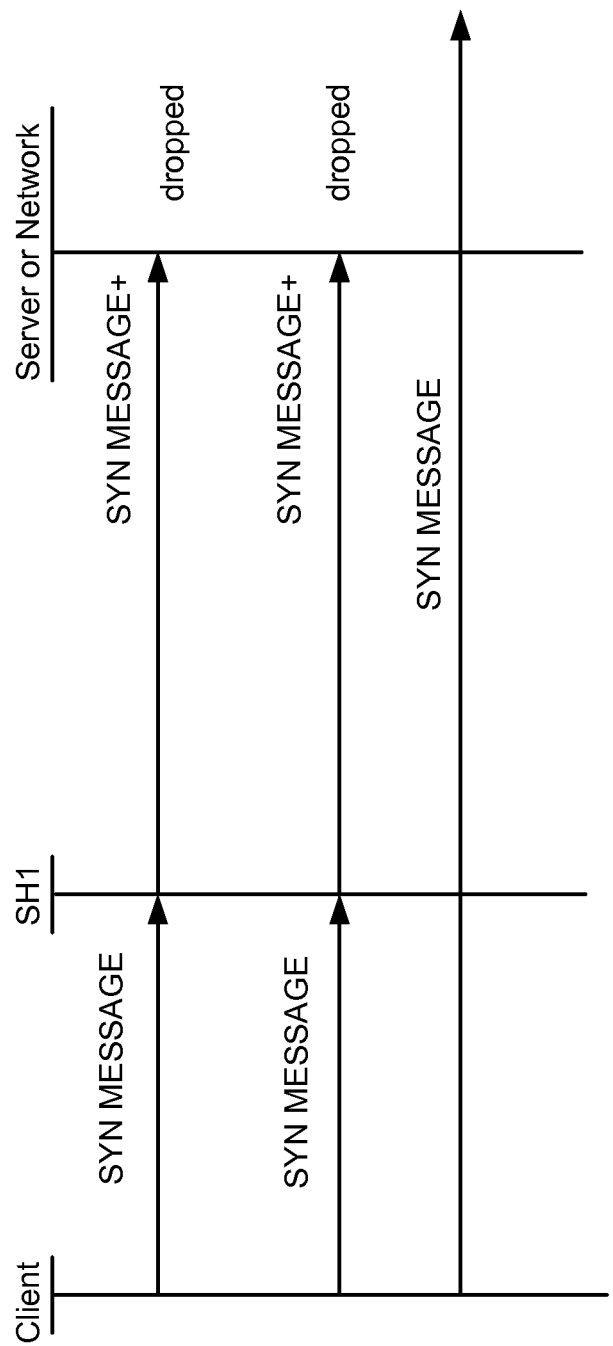
FIG. 3 is a swim diagram illustrating probe request events wherein probe requests might be dropped.

FIG. 3 is a swim diagram illustrating this situation. As illustrated there, the client sends a SYN and SH1 adds a probe request (indicated by "SYN+" or "SYN MESSAGE+" in the figures) and forwards the packet. If the first SYN fails, SH1 can try again, but if that also fails, SH1 should pass through the unmarked SYN message. The number of failed SYN packets before a proxy defers is programmable. In this case it is two, but it might be one, or more than two.

The approach shown in FIG. 3 works well if there is only one proxy on the path to the server. However, if there are two proxies and the probe survives all the way to the server and the server drops it, all the connections to that server will be passed through even though the proxies could optimize them.

Figure 4:
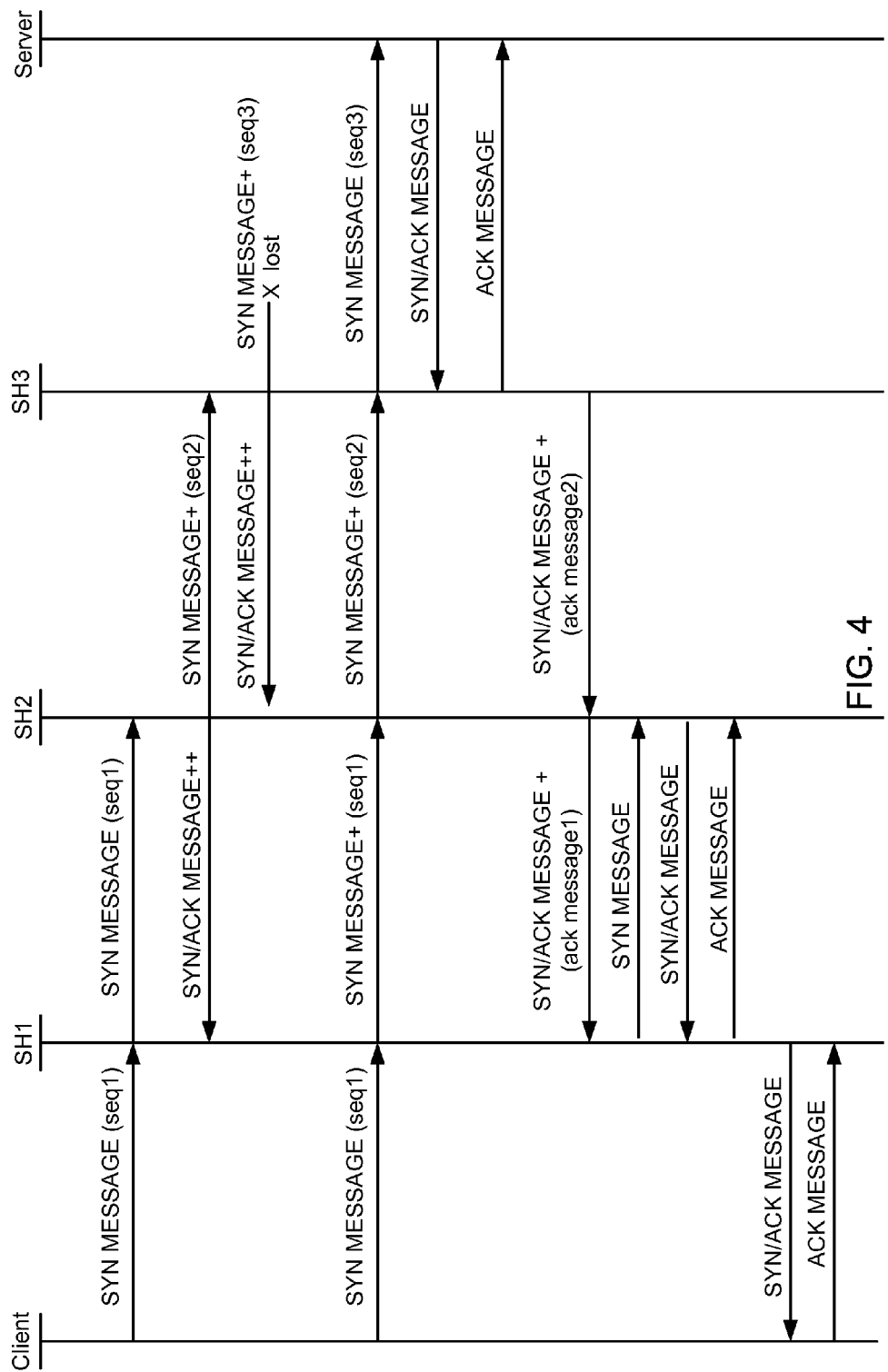
FIG. 4 is a swim diagram illustrating other aspects of probe request message processing.

To avoid this problem, the SP should stop probing before the client stops retransmitting SYN packets, but there are other steps the SP can take. After the first SYN retransmit, the SP can send a pure (unmarked, unmodified) SYN to the server to see if the server sends back a SYN/ACK. That pure SYN has to be transmitted as soon as the first SYN retransmit is received so it will be generated on reception of the SYN retransmit instead of waiting for the local IP stack to generate it. FIG. 4 is a swim diagram illustrating how this would work.

If there are more than two proxies and the SYN+ sent by the last proxy gets lost or dropped, the next SYN received by the last proxy may not have the probe, so the last proxy might think that the proxies before it stopped probing or failed. In such a case, the last proxy will close its connection to the server and pass through the SYN. To avoid this case and still intercept between the first and last proxies, a proxy can indicate to the previous proxy that it is not the last one so that that previous proxy still adds a probe for the second SYN. A special SYN/ACK can be used that is different from a probe response but has the same client/server IP addresses and ports and the same TCP option as the probes. It will also use a proxy-generated seqnum since the proxy has not received a packet from the server yet. If the probe is lost before reaching the last proxy then the connection will not get intercepted by the first and last proxy.

Figure 5:
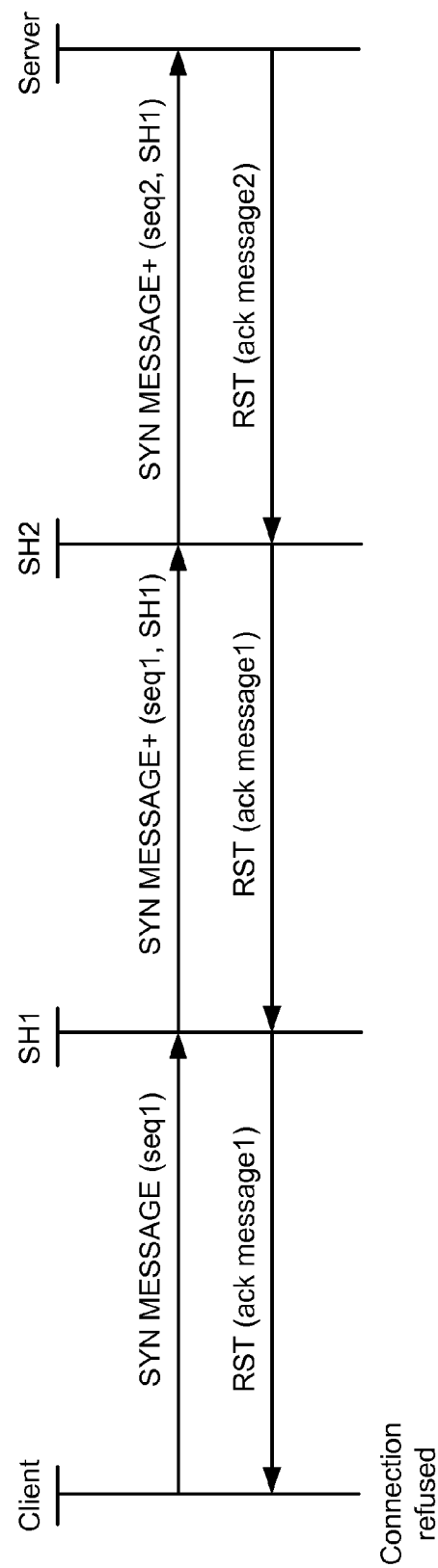
FIG. 5 is a swim diagram illustrating other aspects of probe request message processing.

If the server does not accept the connection, the server would send back a reset instead of a SYN/ACK and the proxies would just pass it through to the client, which would then know that the connection was refused. No inner connection would be established. FIG. 5 illustrates an example operation of this situation.

Figure 6:
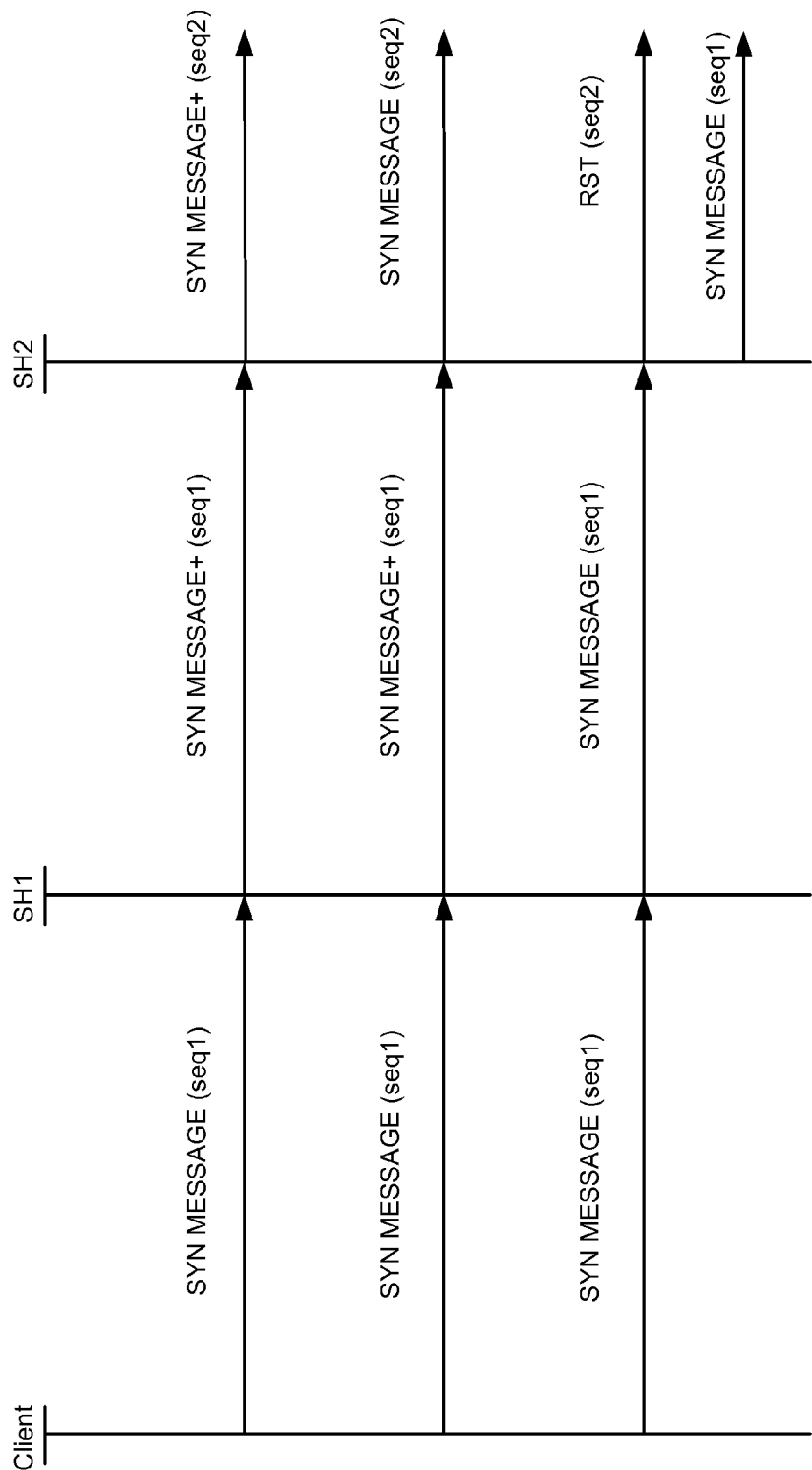
FIG. 6 is a swim diagram illustrating other aspects of probe request message processing.

In other situations, if the server is unreachable, no packet would come back and the client would normally retransmit the SYN and then timeout. Like in the dropped TCP option case, the proxy will stop adding the probe after 2 retransmits. FIG. 6 illustrates an example operation of this situation.

In some situations, if a virus is creating these invalid connections, there may be a resource consumption problem. To avoid that problem, the number of probes allowed to be ongoing for a single client on the first proxy might be limited, with SYN packets being passed through if that limit is exceeded.

Figure 7:
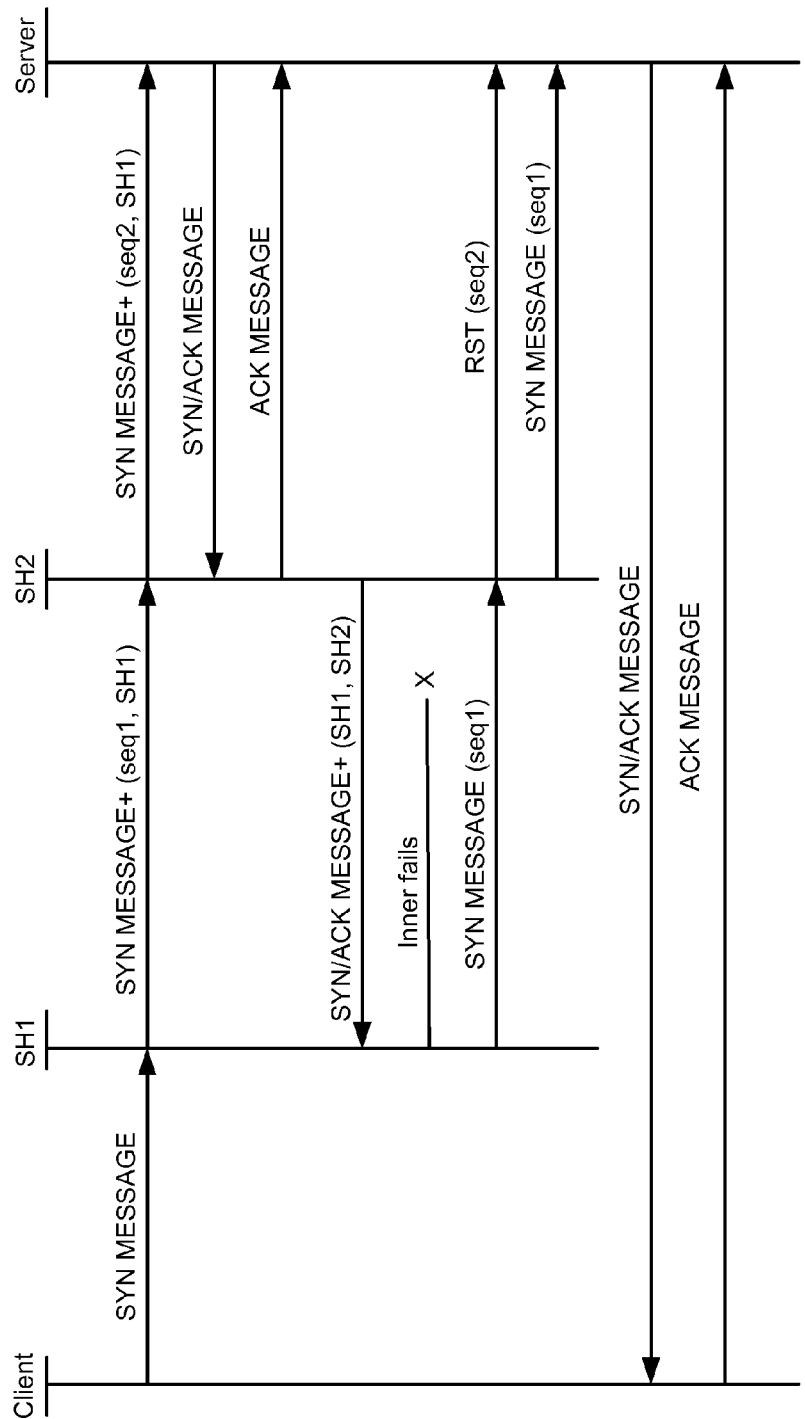
FIG. 7 is a swim diagram illustrating other aspects of probe request message processing.

If the inner connection fails after the server-side proxy has connected to the server and the auto-discovery succeeded, the system needs to tear down that server-side connection and let the connection pass through. The server-side proxy also needs to resend the original SYN to establish the connection. During the time the client-side proxy is trying to connect to the server-side proxy, an embodiment drops any SYN retransmitted from the client. FIG. 7 illustrates an example operation of this.

In the example of FIG. 7, it is represented that a client sends a SYN to the server. SH1 attaches a probe request to the SYN with its IP address in it. SH2 receives the probe request and checks that it was not sent by SH2 itself. SH2 creates its own TCP connection to the server with a different sequence number. SH2 attaches the same probe as SH1 to the SYN. SH2 receives a SYN/ACK from the server. SH2 completes its connection to the server with an ACK. SH2 sends a probe response with its service IP address and port and modifies the ACK number. SH1 receives the probe response from SH2 and connects to SH2 service IP address and port. If the connection from SH1 to SH2 fails, SH1 sends an RST (reset) packet for the original connection. SH2 closes its connection with the server by resetting it. SH1 resends the original SYN sent by the client. All following packets are passed through Another embodiment is a variation of previously discussed embodiments for discovering proxies, still just using SYN packets but without causing any unnecessary connections on the server. In this variation of an embodiment, messages travel from client to SH1, SH2, SH3, and then to the server. When a packet reaches SH1, it adds probe header as discussed above. The SYN with a probe header then reaches SH2. SH2 generates a new SYN packet, but doesn't actually create a socket. Instead, the new SYN is templated on what would happen if SH2 actually tried to connect to the server. SH2 adds a different probe header (PROBE_CONTINUE) to this, but keeps the SH1 return information in it, and sends it on.

If SH3 does not exist, then the server responds with SYN/ACK to SH2's SYN. SH2 then has to ensure that it can create an actual socket, using this SYN/ACK. SH2 then communicates back the SH1 to tell it who its partner is. If SH3 does exist—it sees SH2's SYN with the PROBE_CONTINUE and generates its own PROBE_CONTINUE SYN packet, and sends it on to any other intermediate proxies, which perform similar actions, or the server, which responds as described above.

In general in this embodiment, each proxy after the first one generates its own SYN packet that it will use to probe the server; only the probe command is different. If the server responds, then the half-open TCP connection actually has the right TCP options, timestamps, etc. to match the proxy it will be talking to.

The following discussion of connection forwarding is relevant regardless of which autodiscovery technique is in use, as long as the technique can support a cascade of proxies. Connection forwarding as described in Ly takes care of server side asymmetric routing when there is a proxy on each route, and that continues to work. However, the connection forwarding request must be sent to the neighbor proxy/proxies before the proxy forwards the probe request to the server. Similar processing must be done by all intermediate proxies as well. Thus, when the probe response is received by an intermediate proxy, it needs to tell its neighbors to release state too.

Figure 8A:
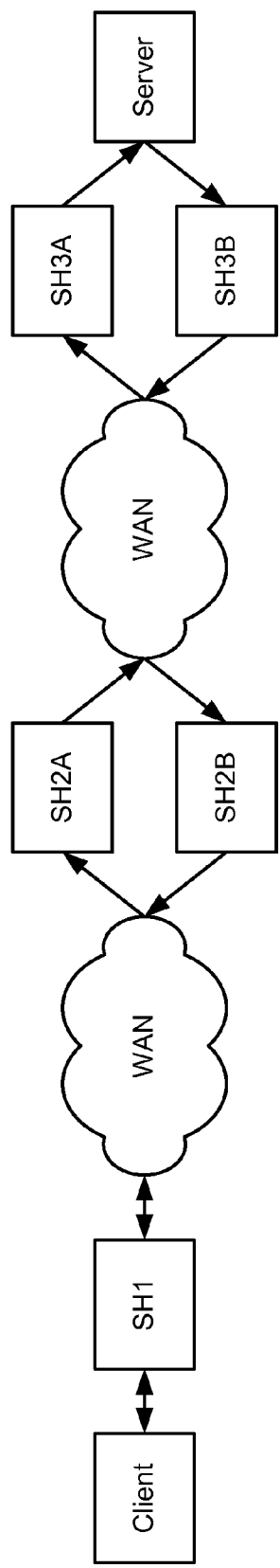
FIG. 8A is block diagram of a network topography wherein packets take one path in one direction and another path in the other direction.
Figure 8B:
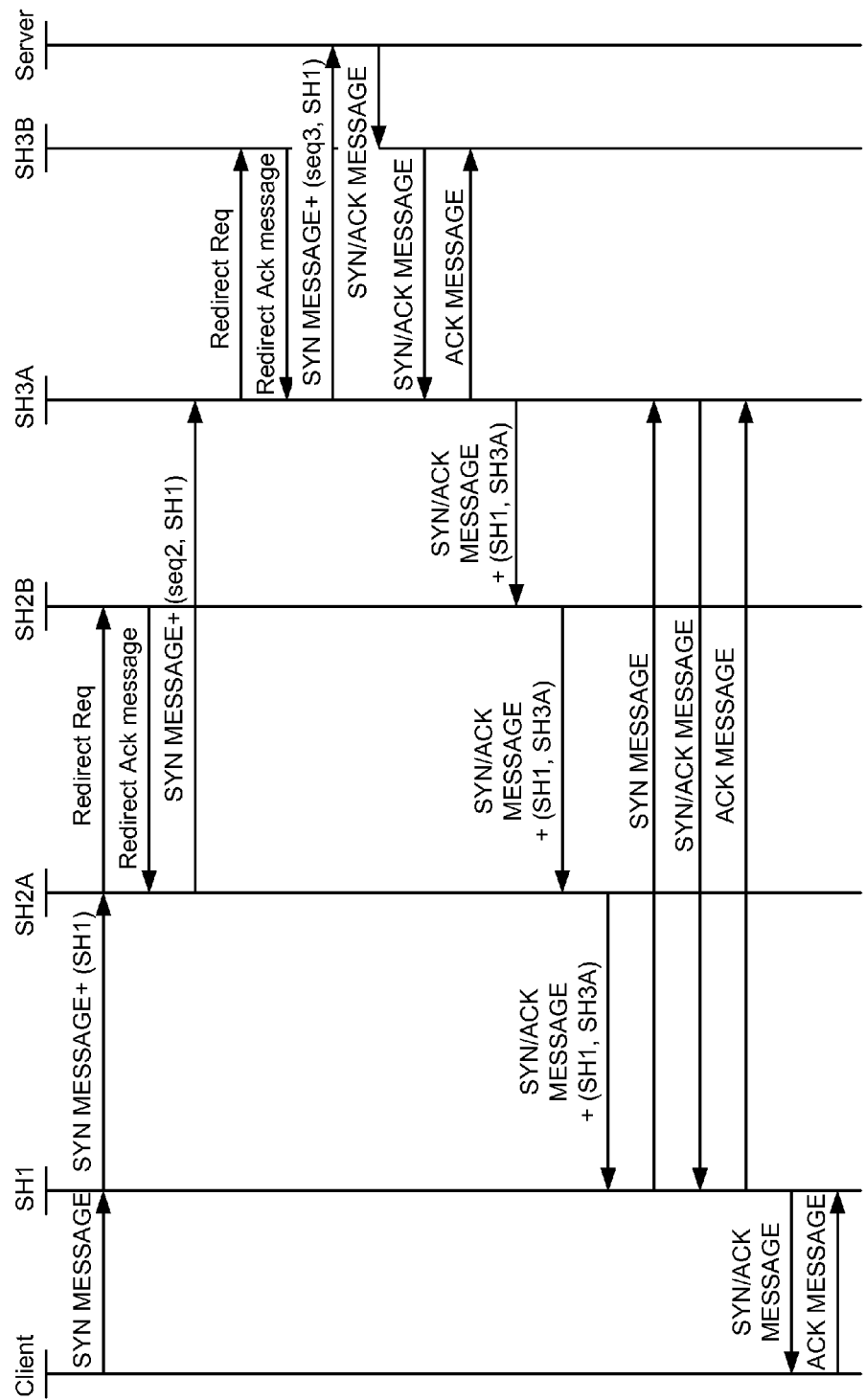
FIG. 8B is a swim diagram illustrating an example packet flow for the network of FIG. 8A.

For example, consider the example network shown in FIG. 8A, where the packets go through SH2A and SH3A in the forward direction and through SH3B and SH2B in the reverse direction. An example packet flow for the network of FIG. 8A is shown in FIG. 8B. Similar packet flows may be used for asymmetric routing with client-side proxies.

If there is asymmetric routing and one side of the path does not have a proxy, an embodiment of the system of proxies should detect the problem during connection setup so as to avoid intercepting the connection. As described in McCanne IV, the inner connection was established before the outer connections so even if there were asymmetric routing, the proxies would have established an inner connection before the connection would break. The outer connections between proxies and clients and/or servers can be established before the inner connection between proxies so that detection can be done before the inner connection is created.

If packets for an intercepted connection do not go through the proxy that is optimizing the connection, the connection will break because the original TCP connection has been terminated at the CP and a different connection created between the SP and the server. So the client and server do not actually expect packets coming from each other. This problem could happen either because the user did not cover all the network paths with proxies or because the user used connection forwarding but one of the proxies in the neighbor group failed.

In the absence of asymmetry detection, if a connection is asymmetrically routed, it will fail each time because the proxies will try to intercept it every time. Detecting asymmetrically routed connections during connection establishment lets them pass through without optimizing them. Even in an environment that allows asymmetric routing, not all connections are asymmetrically routed. Where asymmetric routing is detected on a connection-by-connection basis, the proxies can intercept connections that are not asymmetrically routed in an asymmetrically routed network.

One way to not break an asymmetric connection is by trying to recreate the exact same connection between the SP and the server as between the client and the CP. In particular, that connection would use the same TCP sequence number on both sides. A problem with this scheme is that the data exchange is not always the same on both sides because of optimization done, such as read-ahead at the server. If packets somehow are received directly by the other side without going through a proxy, the other side might accept them at the wrong offset and in the worst case, write some data at the wrong place. This is similar to the problems that can occur with the prior art on network transparency, as described in Landrum.

To avoid this problem, an embodiment does not depend on sequence numbers. When a connection is asymmetrically routed and packets reach the other side without going through the local proxy, the end hosts do not expect those packets. If that happens in the middle of a connection, the end hosts usually just drop the packets or sends back an ACK with what they are expecting and the connection stalls until it times out or gets closed somehow. Also the application or the user will reopen the connection and at that time the connection should have its asymmetry from the beginning. In general, routing rarely changes in the middle of a connection and it is the result of a failure somewhere in the network, except in networks with packet load balancing.

Typically, when a connection is intercepted, the SYN packet sent by the SP to the server does not have the same sequence number as the SYN sent by the client so if the client receives the SYN/ACK sent back by the server, the client is not supposed to accept it. Traditionally, TCP implementations sent a RST in response to the invalid SYN/ACK packet (the "RST case"). However, with the widespread deployment of client-side firewalls, there is no guarantee that the client will ever send out a RST.

For this reason the system of proxies needs to handle both cases. In the no-RST case, the proxies may detect asymmetric routing by detecting a retransmitted SYN or a series of retransmitted messages. In some implementations, embodiments need to be aggressive in detecting asymmetric routing. For example, some TCP/IP message stacks, such as Windows XP SP2, only retransmits a SYN packet twice before giving up. Thus, the first SYN retransmitted may be considered an indication of asymmetric routing. This could easily be generalized to use other retransmitted messages when less aggressive detection setting are required.

Once the system detects asymmetric routing, an embodiment notifies all the proxies that were traversed by the initial SYN so that these proxies can create the proper state and not intercept this connection in the future. Also, before the unintercepted connection is established between the client and the server, we need to properly reset the "fake" connection between the SP and the server.

In the RST case, upon receiving an RST with an ACK number it does not expect, the first proxy marks the 5-tuple as non-interceptible and retransmits the original SYN packet, this time without the probe. In the no-RST case, the first proxy to see the retransmitted SYN marks the 5-tuple as not interceptible, and forwards the SYN (without attaching a probe). This probe-less SYN is seen and forwarded by all the proxies along the way and used to put the 5-tuple into the non-interceptible state. The last proxy first tears down the "fake" connection before forwarding the SYN.

Embodiments of this asymmetric routing system depend on proxies knowing whether they are the last or outermost proxy in a sequence. This knowledge can be determined during a stage of auto-discovery, as described above.

Figure 9A:
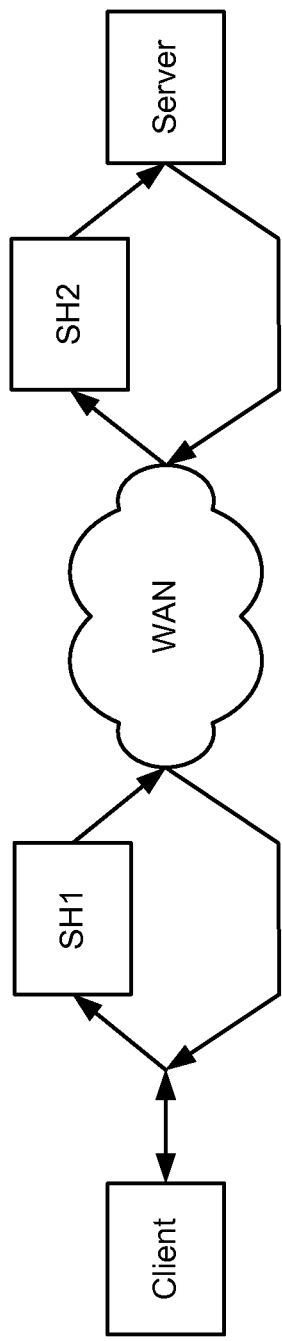
FIG. 9A is block diagram of a network topography wherein asymmetry allows some packets to bypass proxies.
Figure 9B:
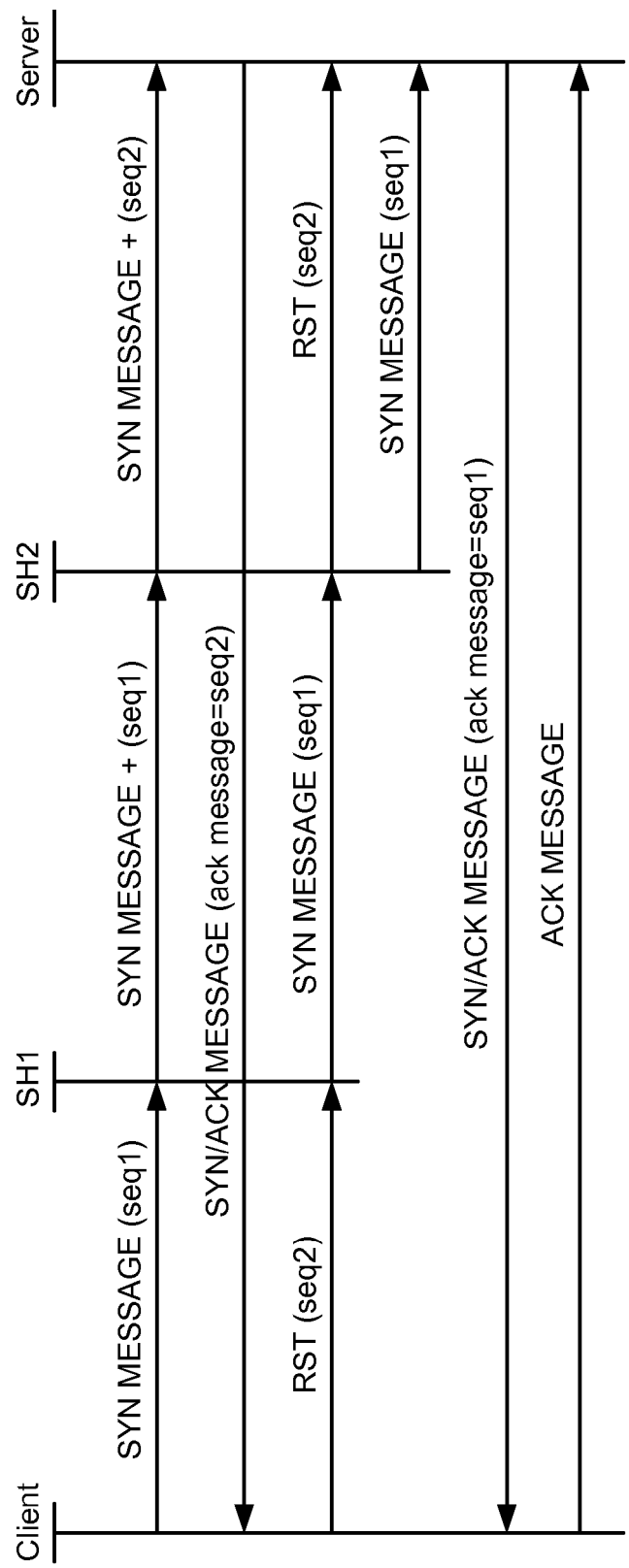
FIG. 9B is a swim diagram illustrating an example packet flow for the network of FIG. 9A.

FIG. 9A illustrates an example network where the asymmetry makes the SYN/ACK not go through any of the proxies. FIG. 9B illustrates an example packet flow for this example network upon receiving an RST message. In this example, the last proxy may delay for a small amount of time (perhaps 100 ms or so) between the sending of RST(seq2) and SYN(seq1). This behavior will not necessarily be triggered by the first retransmitted SYN; it should be a configurable parameter. Additionally, since Windows XP and other network stacks may only retransmit a SYN twice, SH1 may use the third SYN to trigger the pass-through due to asymmetric routing.

Figure 9C:
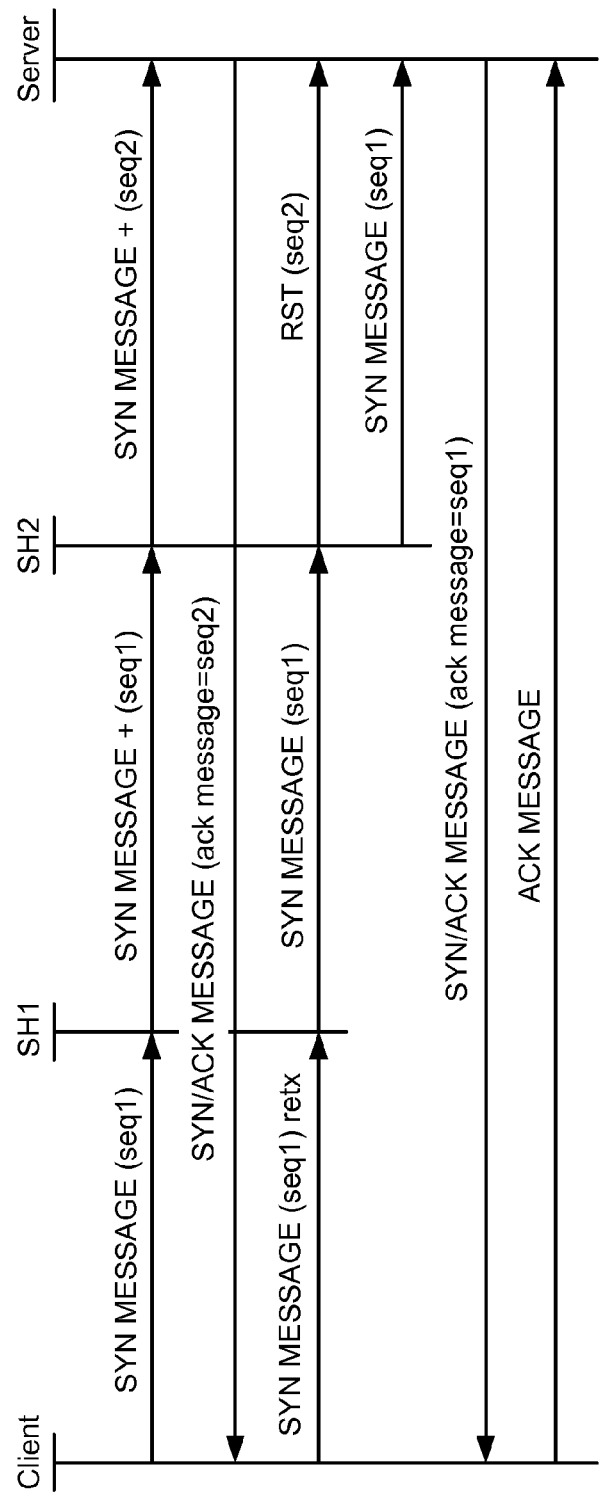
FIG. 9C is a swim diagram for another example of message flow for the network of FIG. 9A.

Similarly, FIG. 9C illustrates an example packet flow for this example network when an RST message is not received. In this example of FIG. 9C, SH1 both sends and receives the retransmitted SYN(seq1), indicating that SH1 updates internal state upon receiving this retransmitted SYN packet.

Figure 10A:
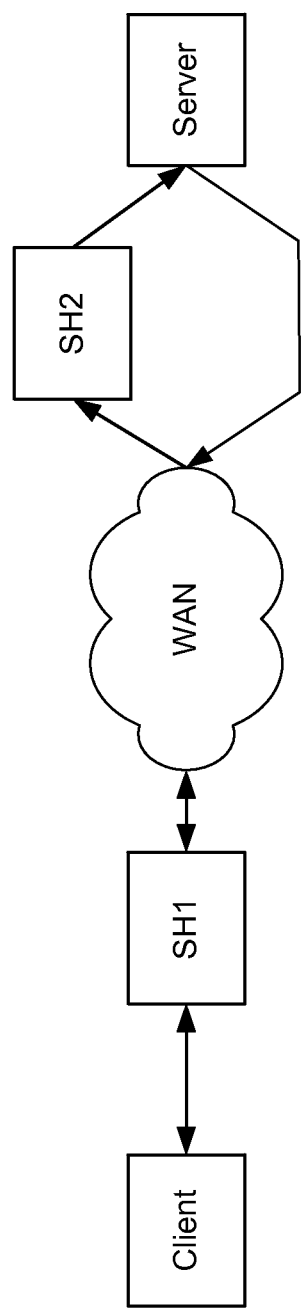
FIG. 10A is a block diagram for another example network with a different type of asymmetry, with asymmetry at the server end of a WAN.
Figure 10B:
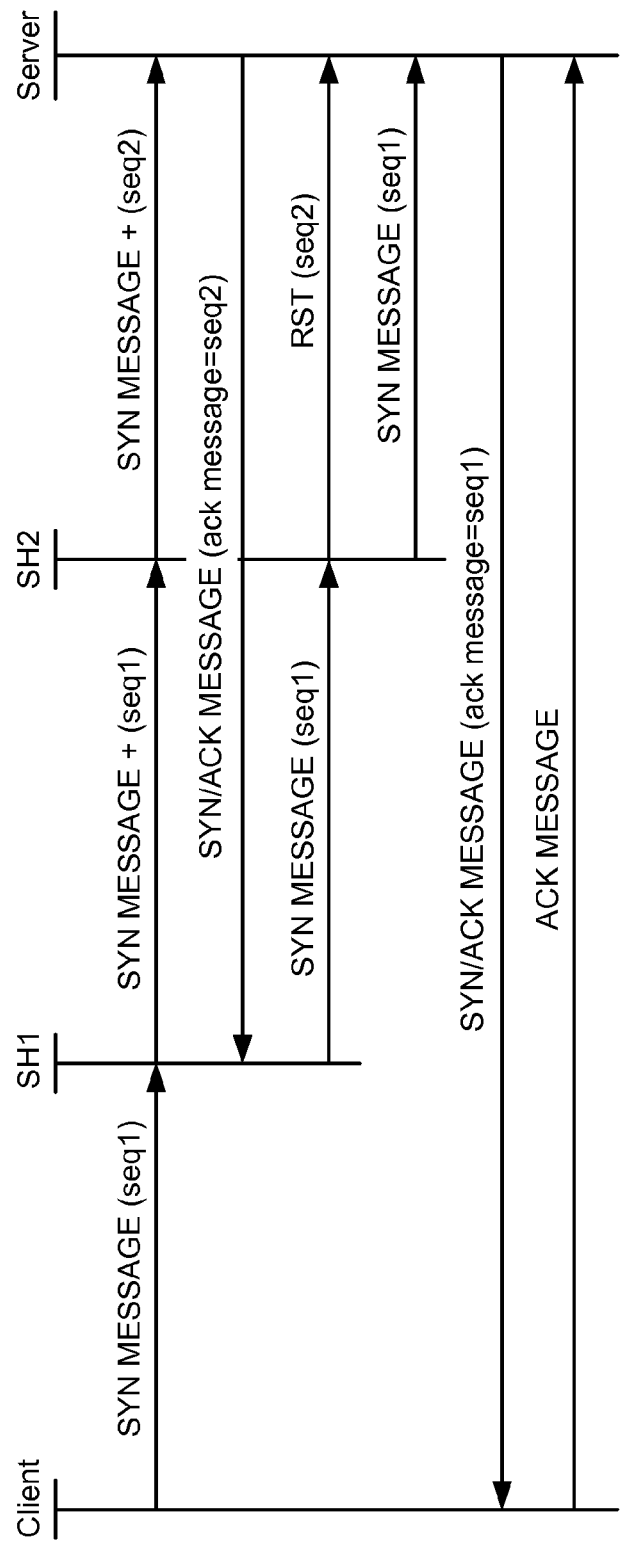
FIG. 10B is a swim diagram illustrating an example packet flow for the network topology of FIG. 10A.

FIG. 10A another example network with a different type of asymmetry. FIG. 10B illustrates an example packet flow for this example network. If the asymmetry is only on the server side and the client-side proxy actually sees the SYN/ACK from the server, it will generate a SYN itself to signal the server-side proxy of the asymmetry. The reason for generating the SYN instead of forwarding the SYN/ACK to the client and waiting for it to send a RST or retransmit the SYN is that the client TCP stack might not generate a RST and it would delay the connection but since we see that the SYN/ACK is acknowledging a different sequence number and that it is not a probe response, we know that another proxy intercepted our probe request and that it did not receive the SYN/ACK from the server.

Figure 11A:
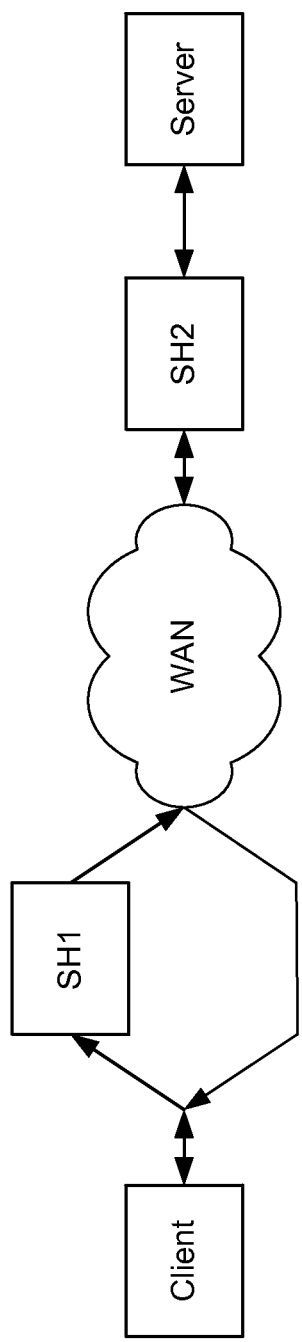
FIG. 11A is a block diagram for another example network with a different type of asymmetry, with asymmetry at the client end of a WAN.
Figure 11B:
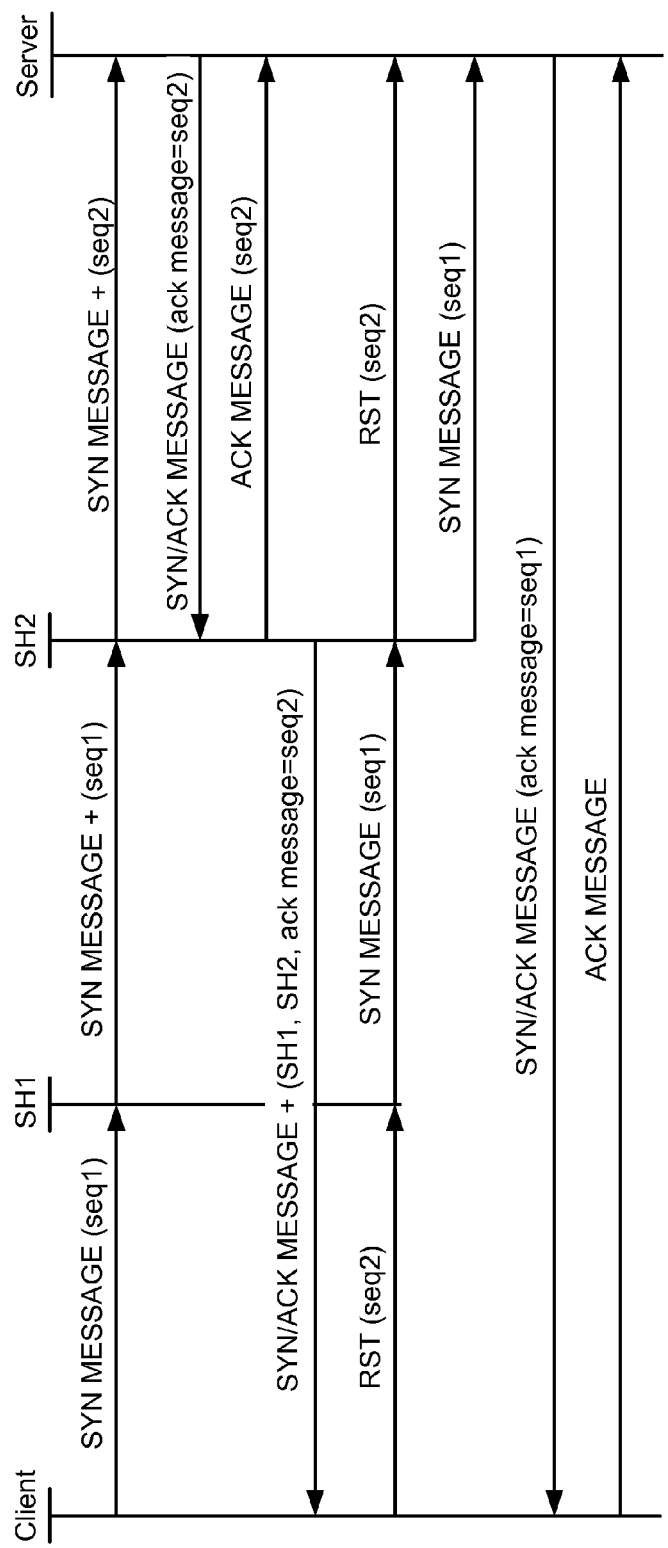
FIG. 11B is a swim diagram illustrating an example packet flow for the network topology of FIG. 11A.
Figure 11C:
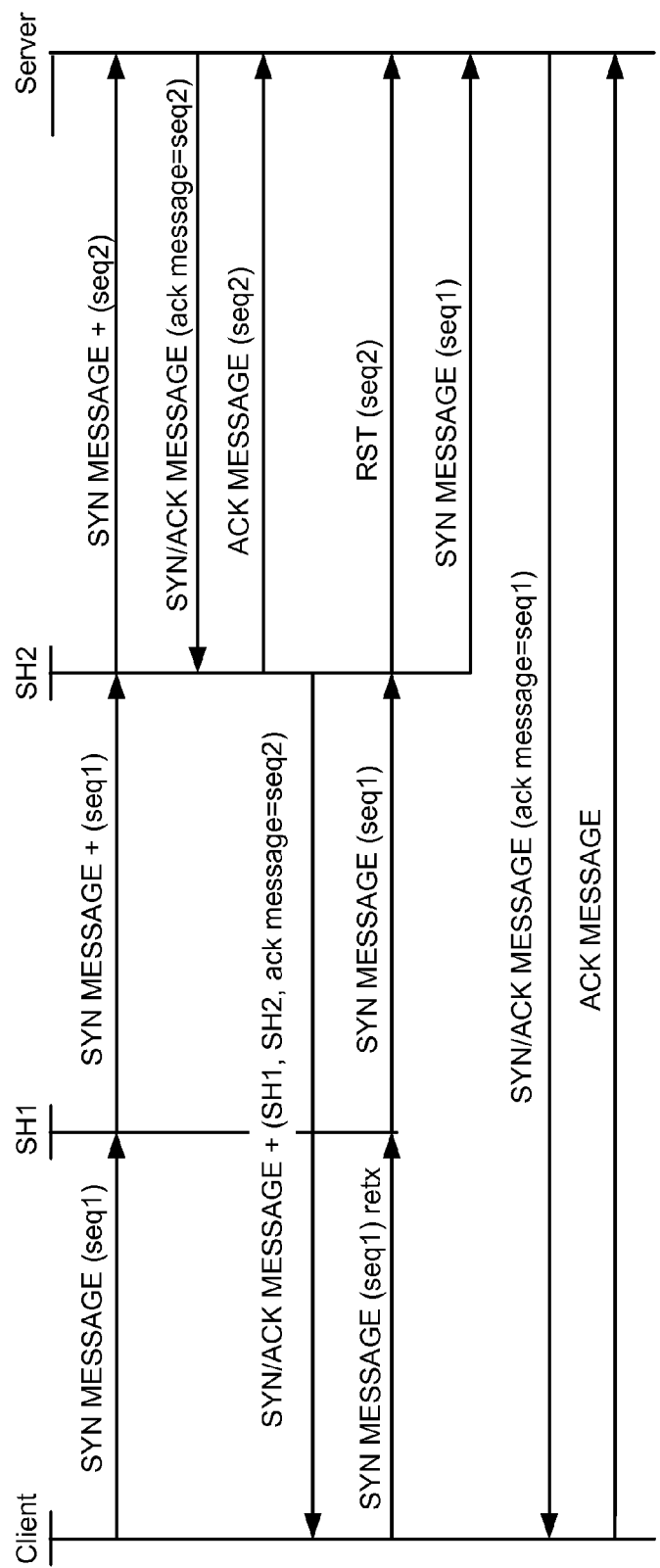
FIG. 11C is another swim diagram for message flow for the network of FIG. 11A.

FIG. 11A another example network with a different type of asymmetry. FIG. 11B illustrates an example packet flow for this example network upon receiving an RST message. Similarly, FIG. 11C illustrates an example packet flow for this example network when an RST message is not received. In this example, the problem in this case is that the probe response sent by the SP does not go through the CP. Functionally, these scenarios do not require any different logic than that already used to handle the "complete" asymmetry case discussed above.

Figure 12A:
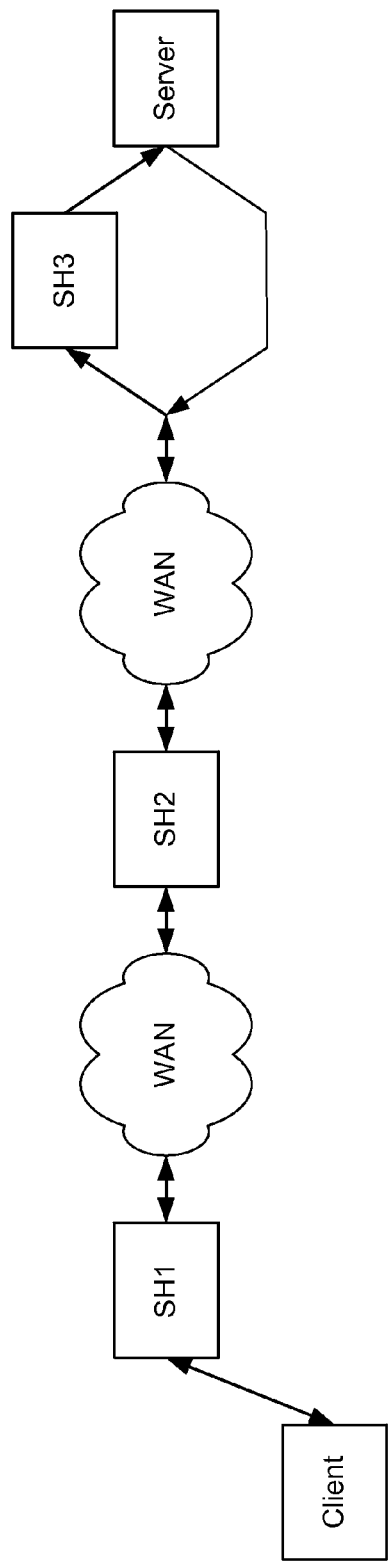
FIG. 12A is a block diagram for another example network with a different type of asymmetry, with asymmetry at the server end of a WAN with a proxy chain.
Figure 12B:
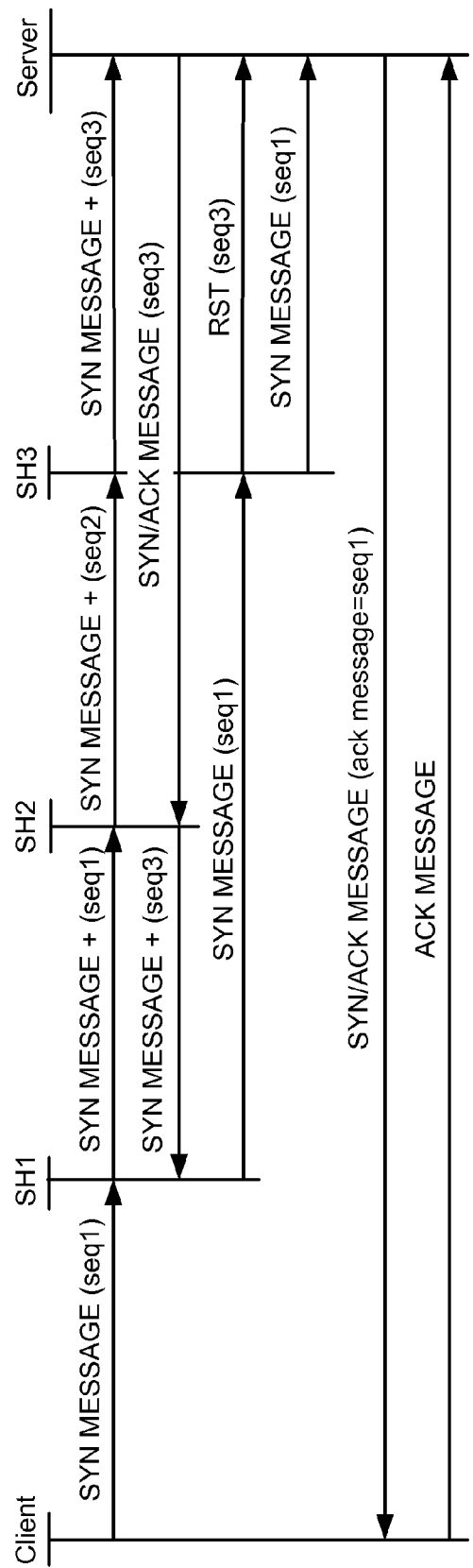
FIG. 12B is a swim diagram illustrating an example packet flow for the network topology of FIG. 12A.

FIG. 12A another example network with a different type of asymmetry. FIG. 12B illustrates an example packet flow for this example network. The difference between this case and the server-side asymmetry case is that SH2 is the proxy that detects the asymmetry and it must notify proxies on both sides. In this embodiment, the SYN/ACK with the invalid sequence number is allowed to propagate all the way back to the message to the client-side proxy before we send the probeless SYN to the server.

The following pseudo-code describes the asymmetric routing detection behavior described above. In various embodiments, this pseudo-code may be implemented as a single code block or optimized by merging portions of it into existing code in multiple places associated with the intercepting packets. In further embodiments, the proxies maintain a list of connections that are not interceptible as part of the asymmetric routing discovery state.

In further embodiments, the handling of the no-RST case will also fix the problem when the server or an intermediate network device drops the probe request. Additionally, the proxy could cache the fact that a connection is asymmetrically routed so that the next time it sees it again, it directly passes it through but the routing might depend on the IP addresses, the TCP ports and the QOS value.

However, caching based on all those parameters might make it inefficient since the proxy will rarely see the same connection twice. A further embodiment may not do caching for asymmetrically routed connection but instead rely only on detection and retransmission of the SYN packet to let the connection pass through. To avoid delaying the connection setup, in such an embodiment the proxy may then retransmit the SYN packet itself instead of waiting for the client to do it.

The above embodiments describe mechanisms for detecting asymmetric routing on the fly in the case where there is no packet load balancing. Further embodiments may detect asymmetric routing in the case where there is packet load balancing. In the presence of packet load balancing the connection setup might succeed but packets after the setup might not go through one or both of the proxies. The proxy that terminates the load balanced end of the TCP connection is referred to as the local proxy or LSH, and the other proxy is referred to as the remote proxy or RSH.

Figure 13A:
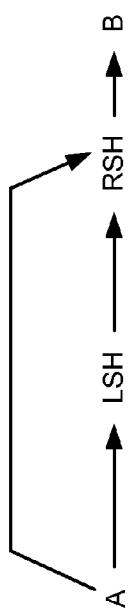
FIG. 13A is a block diagram illustrating an example network with asymmetry due to packet balancing.

FIG. 13A illustrates an example network with asymmetry due to packet balancing. In this example, the LSH is bypassed due to load balancing. In the case of just LSH being bypassed, RSH will receive this packet on the WAN interface and recognize that there must be an unexpected problem with routing between the client and the server. This can be either due to load balancing or a permanent route table change somewhere along the line. In either case, RSH will notify LSH of this event through the internal TCP connection.

Figure 13B:
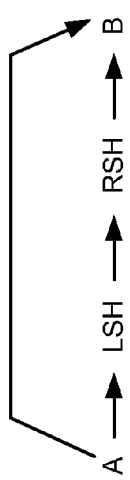
FIG. 13B is a block diagram illustrating another example network with asymmetry due to packet balancing.

It becomes harder to detect load balancing if both proxies are bypassed. FIG. 13B illustrates an example network with asymmetry due to packet balancing that bypasses both LSH and RSH. If data is flowing from A to B, LSH will get a clue that something is wrong by detecting excessive packet loss from A. Once a certain user-configurable packet loss threshold is reached, it will be interpreted as an indication of A being load balanced.

If data is only being sent from B to A, LSH will not be able to detect packet loss. However, RSH will see an excessive amount of retransmits from B since ACKs from A do not reach B reliably (with the correct acknowledgement number). In this case, RSH will also notify LSH of this event through the internal TCP connection. We could also look for duplicate ACKs sent by B since that's what the TCP RFC requires a TCP implementation to do upon receiving an out-of-window TCP segment. However, we cannot rely on this method since a client-side software firewall will filter the "invalid" incoming TCP segment in the first place.

Once LSH determines that there is a problem, either through detecting packet loss, or through receiving a notification from RSH, it caches A's IP address and does not optimize any of its future connections. This cache will have a user-configurable timeout period.

The previous discussions describe embodiments that detect asymmetric routing in the presence of asymmetric routing with or without packet load balancing. The following embodiment includes an asymmetric routing detection mechanism that is less dynamic than the two previous mechanisms but is simpler.

This embodiment detects asymmetric routing (AR) during connection establishment while we are doing auto-discovery. Once AR is detected, the pair of IP addresses, defined by the client and server addresses of this connection, is cached on the proxy in the AR cache. Further connections between those hosts are not optimized until that particular AR cache entry times out.

Embodiments of the AR detection mechanism are triggered by different kinds of network events that are indicative of AR. These events are listed below:

CP receiving an RST packet from the client with an invalid SYN number while the connection is in the SYN_SENT state CP receiving a SYN/ACK packet from the server with an invalid ACK number while the connection is in the SYN_SENT state CP receiving an unusually high number of SYN retransmits from the client The following illustrates different example asymmetric routing scenarios and illustrates where these network events fit in.

Complete Asymmetry

Figure 14A:
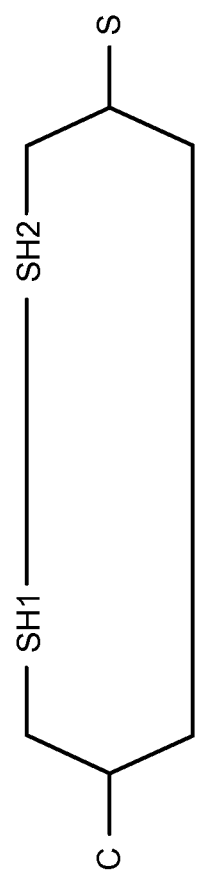
FIG. 14A is a block diagram illustrating yet another example network with asymmetry due to packet balancing.
Figure 14B:
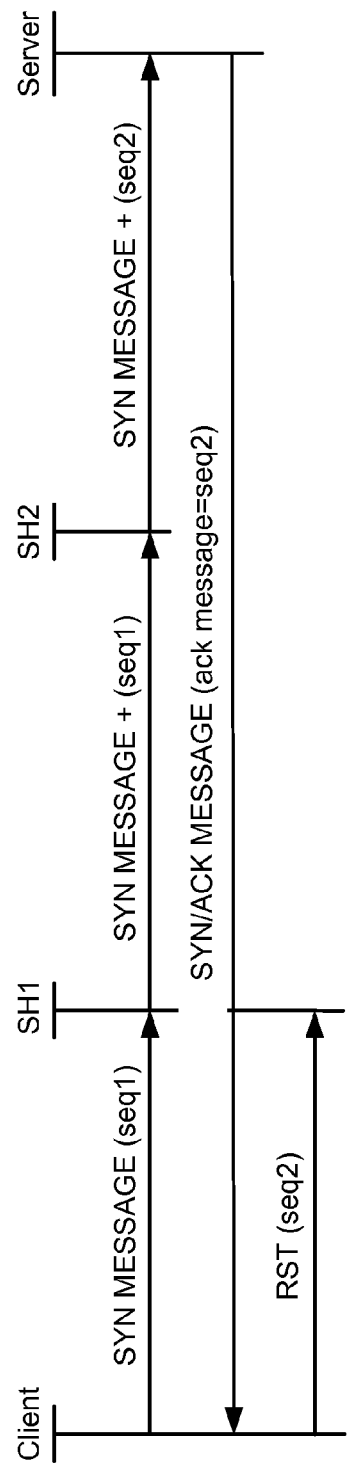
FIG. 14B is a swim diagram illustrating an example packet flow for the network topology of FIG. 14A.

In the "complete asymmetry" case, the packets sent from client (C) to server (S) go through both proxies (SH1 and SH2), but packets sent from S to C do not go through either. FIG. 14A illustrates an example network with complete asymmetry. FIG. 14B illustrates an example packet flow for this example network. In this example, SH1 detects asymmetric routing by receiving the RST packet with a bogus sequence number. Future connections between client and server will not be optimized.

Figure 14C:
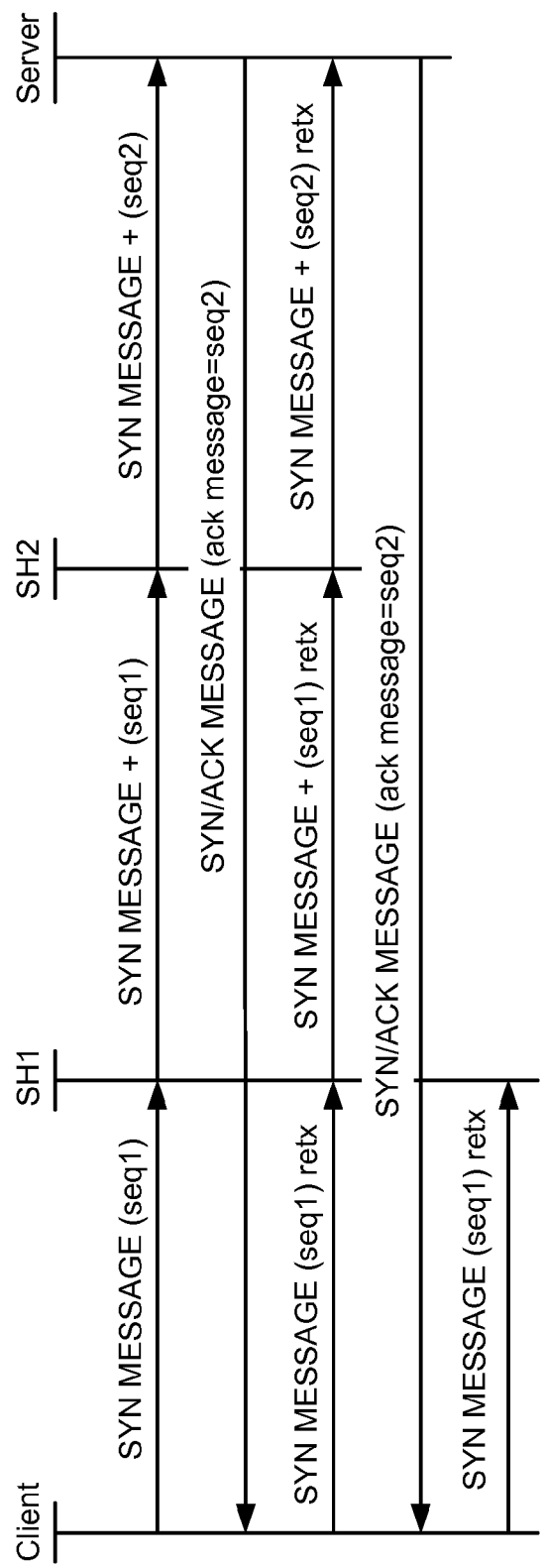
FIG. 14C is a swim diagram illustrating another example packet flow for the network topology of FIG. 14A, wherein a local firewall filters out invalid SYN/ACK packets with non-matching ACK numbers.

FIG. 14C illustrates another example packet flow for this example network. In this example, the client's local firewall filters out the invalid SYN/ACK with a non-matching ACK number. After a preconfigured number of SYN retransmits (max_syns_before_passthrough, here set to 2), SH1 assumes asymmetric routing and stops trying to optimize any future connections between client and server. Note that this condition can be caused by the server being down or by a firewall filtering out our probe packets. Also of interest is the fact that networking processes in the Microsoft Windows XP™ SP2 operating system and possibly others does not filter out the invalid SYN/ACK with its firewall turned on and does send out a RST.

Server-Side Asymmetry

Figure 15A:
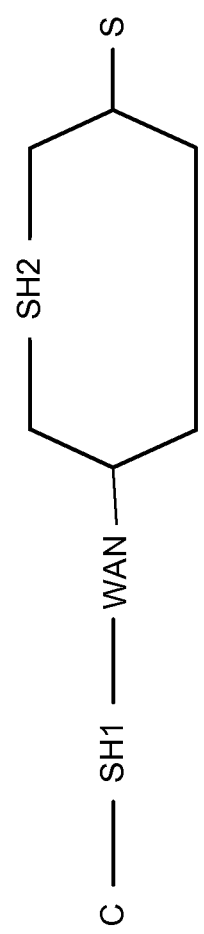
FIG. 15A is a block diagram of an example network topology with server-side asymmetry.
Figure 15B:
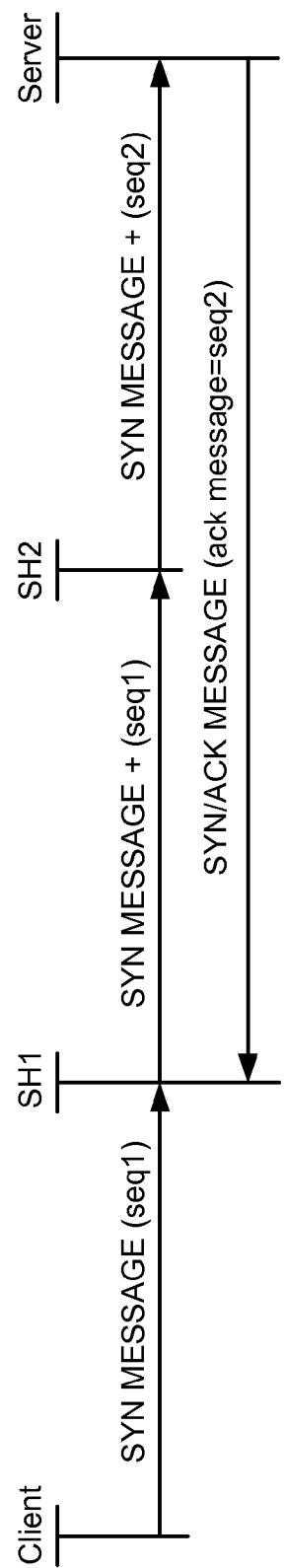
FIG. 15B is a swim diagram illustrating an example packet flow for the network topology of FIG. 15A.

In this case, packets traveling from C to S traverse SH1 and SH2, but packets traveling from S to C only traverse SH1. FIG. 15A illustrates an example network with server-side asymmetry. FIG. 15B illustrates an example packet flow for this example network. In this example, SH1 receives an invalid SYN/ACK from S and thereby detects asymmetric routing.

Client-Side Asymmetry

Figure 16A:
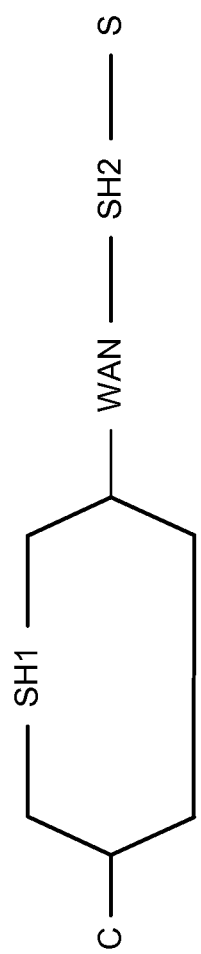
FIG. 16A is a block diagram of an example network topology with client-side asymmetry.
Figure 16B:
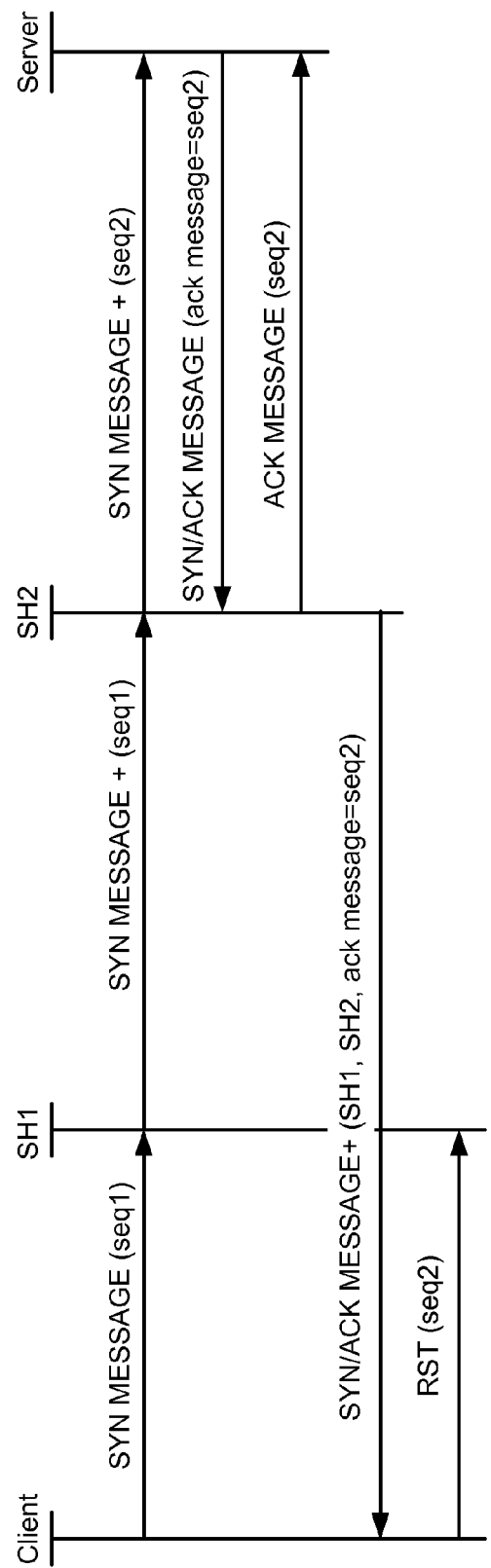
FIG. 16B is a swim diagram illustrating an example packet flow for the network topology of FIG. 16A.

In this case, packets traveling from C to S traverse SH1 and SH2, but on the way back they only traverse SH2. FIG. 16A illustrates an example network with client-side asymmetry. FIG. 16B illustrates an example packet flow for this example network.

In this example, if the proxies are configured with auto-discovery as described in McCanne IV, SH2 will try to respond to SH1 with a SYN/ACK+ to SH1's SYN+. The client will receive this packet and respond with an ACK since the SYN/ACK+ acknowledges the sequence number in the SYN+. SH1 will see this ACK and will realize there is asymmetric routing because it never saw a SYN/ACK. In embodiments of auto-discovery as described in this application, AR is detected at "no extra cost" since the SYN/ACK+ has a different sequence number from the original SYN+.

Figure 17:
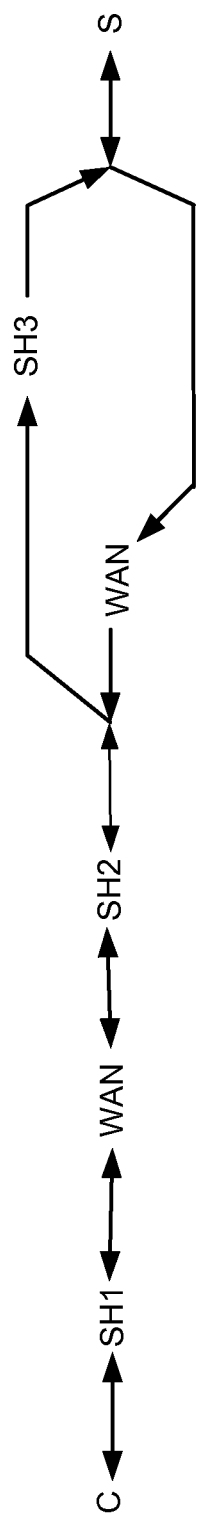
FIG. 17 is a block diagram of an example network topology with server-side asymmetry and a chain of proxies.

In another example of client-side asymmetry, embodiments of auto-discovery may include cascading proxies, as shown in FIG. 17. In this example, packets from C to S traverse SH1, SH2, and SH3, but on the way back they only traverse SH2 and SH1. The simple mechanism cannot detect AR in this case.

SYN retransmits can happen for a number of reasons other than asymmetric routing. For instance, if a server is temporarily down or if probes are being filtered and there is no SP, the CP will see SYN retransmits. For this reason, we handle SYN retransmits in a special way. When an asymmetric routing cache entry (arentry) is added due to SYN retransmits, it's given a very short timeout (artab_short_timeout). This arentry quickly times out unless one of the following conditions is met:

A SYN/ACK is received from the server after we stop sending probes out; or

An ACK is received for this connection from the client without the CP seeing the SYN/ACK from the server.

The first case is an indication of the probes being filtered and the second case is indication of either client-side or complete asymmetry. In both cases, the arentry's timeout is reset to artab_timeout.

The case where not all proxies see packets sent from client to server is trivial to handle gracefully: if a proxy does not see a SYN or a SYN+, it won't try to intercept the connection to begin with, and the connection will not be broken. The proxy can recognize this condition and mark the connection as one that is passed through because of asymmetry. If the proxy ever sees packets associated with this connection from client to server, it will re-mark the connection as passed-through because it was pre-existing.

The previous discussion outlined a simple means of detecting asymmetric routing. The next section explains how more sophisticated proxy groupings can be used instead of simply finding the outermost pair. Current proxies are organized in terms of one logical proxy on each side of the WAN. That is, even when there are multiple proxies available (for redundant hardware or multiple routes) the autodiscovery sends the traffic through a single proxy on each side.

Networks may include nested or layered proxies, where the traffic intrinsically passes through two or more proxies on the same side of the WAN. In particular, embodiments take advantage of data stores that are already known at any local proxy to automatically set up such a group of local peers. However, that requires distinguishing the proxies on the local side of the WAN from proxies in the WAN or on the other side of the WAN.

This can be done using cooperative caching, such as the cache protocol described in RFC 2186. Grouping of multiple local segment stores is described in McCanne I and detection of middle proxies is described in McCanne IV. Using these techniques, embodiments may look for a TCP option's presence or absence to determine the set of middle proxies, as described in the auto-discovery filing. The middle proxies then constitute a new group with a new job: figuring out their relationship to each other and to the identified client/server proxies.

For any given set of middle proxies interacting with a particular client proxy and particular server proxy, it is possible to compute the location of the WAN boundary once and then reuse it many times. So in contrast to the determination of the counterpart in the client/server proxy pair, this selection can use a fairly expensive computation.

In further embodiments, the middle proxies can use a technique such as chirp-probe trains (see e.g., pathChirp or STAB) to determine where bandwidth is plentiful and where it is scarce. These measurements can then be mapped onto models of networks—in particular, one model of interest is where there is a single sharp decrease in bandwidth somewhere along the path, corresponding to the WAN. For measurements that do not map onto well-understood models, the middle proxies can choose to do nothing (as they would now).

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

APPENDIX A

```
/*
 * asymmetric_detection_test—returns true if reception of pkt signals
 * detection of an asymmetric route, false otherwise.
 */
bool asymmetric_detection_test(pkt)
{
    conn=conntrack_find(pkt)
    if (!conn | // first time we're seeing the probe
    conn->state !="probing") // done w/auto-discovery
    {
    return false;
    }
    if (conn->is_interceptible ==false) {
    return true;
    }
    if (pkt->tcp_flags & RST &&
    pkt->direction ==client to server)
    {
    if (not the client-side proxy) {
        //
        // if seq #'s don't match, must be due to load balancing.
        // will handle as in the generic asymmetry case.
        // omitting for claraity.
        //
    }
    if (pkt->tcp_ack ==conn->next_seq) {
        //
        // client is legitimately trying to reset a connection
        // before it gets established . . . not asymmetric routing
        //
        return false;
    }
    //
    // the "RST" case for both the "complete" asymmetry case and
    // the client-side asymmetry case
    //
    conn->is_interceptible=false;
    retransmit the original SYN packet without the probe
    return true;
    }
    if (pkt->tcp_flags ==SYN) {
    if (client-side proxy) {
        if (conn->num_probes <MAX_PROBES) {
            conn->num_probes++;
            return false;
            //
            // assume asymmetric routing
            //
            conn->is_interceptible=false;
            retransmit the original SYN packet without the probe
            return true;
        }else {
            conn->is_interceptible=false;
            if (server-side proxy) {// e.g., the "last" proxy
            send RST with seq=conn->tcp_seq
                delay 100 ms
            }
            forward the SYN packet w/o the probe
            return true;
        }
    }
    if (pkt->tcp_flags ==SYN|ACK &&
    pkt->direction ==server to client &&
    pkt does not have a probe)
    {
    if (client-side proxy) {
        //
        // server-side asymmetry case (also generic asymmetry)
        //
        conn->is_interceptible=false;
        retransmit the original SYN packet without the probe
        return true;
    }
    if (neither client-side nor server-side proxy) {
        //
        // generic asymmetry case
        //
        conn->is_interceptible=false;
        forward the pkt to its destination. // the client-side proxy will
        // eventually receive it
        return true;
    }
    }
    return false;
}
// END OF SOURCE CODE LISTING
```

What is claimed is:

1. In a network wherein a plurality of proxies are operating in paths between at least one client and at least one server wherein multiple network paths are possible between a client and a server, a method of detecting asymmetric routing wherein packets from the client to the server take one network path and packets from the server to the client take a different network path, the method comprising:
receiving, at a first proxy, a request to initiate a connection;
modifying the request to initiate a connection to include a probe message;
sending the modified request into the network;
receiving, at a second proxy, the modified request;
determining, at the second proxy, an asymmetric path, wherein said determining comprises at least one of:
detecting whether a client-side proxy receives a reset message from the client with an invalid header relative to packet headers that are expected from a symmetrical path, or
detecting whether a server-side proxy receives an acknowledgement message from the server with an invalid header relative to packet headers that are expected from a symmetrical path; and
modifying a second proxy state to a state wherein the second proxy defers from establishing a proxy pair for the connection being requested.

2. The method of claim 1, further comprising caching, at each of the first and second proxies, a pair of addresses, comprising an address of the client for the connection and an address of the server for the connection.

3. In a network wherein a plurality of proxies are operating in paths between at least one client and at least one server wherein multiple network paths are possible between a client and a server, a set of non-transitory computer-readable storage mediums storing instructions that, when executed by a first proxy and a second proxy, cause the first proxy and second proxy to perform a method of detecting asymmetric routing wherein packets from the client to the server take one network path and packets from the server to the client take a different network path, the method comprising:

receiving, at the first proxy, a request to initiate a connection;

modifying the request to initiate a connection to include a probe message;

sending the modified request into the network;

receiving, at the second proxy, the modified request;

determining, at the second proxy, an asymmetric path, wherein said determining comprises at least one of:

detecting whether a client-side proxy receives a reset message from the client with an invalid header relative to packet headers that are expected from a symmetrical path, or detecting whether a server-side proxy receives an acknowledgement message from the server with an invalid header relative to packet headers that are expected from a symmetrical path; and modifying a second proxy state to a state wherein the second proxy defers from establishing a proxy pair for the connection being requested.

4. The set of non-transitory computer-readable storage mediums of claim 3, wherein the method further comprises caching, at each of the first and second proxies, a pair of addresses, comprising an address of the client for the connection and an address of the server for the connection.

5. In a network wherein a plurality of proxies are operating in paths between at least one client and at least one server wherein multiple network paths are possible between a client and a server, a system for detecting asymmetric routing wherein packets from the client to the server take one network path and packets from the server to the client take a different network path, the system comprising:

a first proxy comprising:

a first processor;

a first non-transitory computer-readable storage medium storing instructions that, when executed by the first processor, cause the first proxy to perform a first method, the first method comprising:

receiving, at the first proxy, a request to initiate a connection, modifying the request to initiate a connection to include a probe message, and sending the modified request into the network; and a second proxy comprising:

a second processor;

a second non-transitory computer-readable storage medium storing instructions that, when executed by the second processor, cause the second proxy to perform a second method, the second method comprising:

receiving, at the second proxy, the modified request, determining, at the second proxy, an asymmetric path, wherein said determining comprises at least one of:

detecting whether a client-side proxy receives a reset message from the client with an invalid header relative to packet headers that are expected from a symmetrical path, or detecting whether a server-side proxy receives an acknowledgement message from the server with an invalid header relative to packet headers that are expected from a symmetrical path; and modifying a second proxy state to a state wherein the second proxy defers from establishing a proxy pair for the connection being requested.

6. The system of claim 5, wherein the first method further comprises caching, at the first proxy, a pair of addresses, comprising an address of the client for the connection and an address of the server for the connection, and wherein the second method further comprises caching, at the second proxy, a pair of addresses, comprising an address of the client for the connection and an address of the server for the connection.

\* \* \* \* \*